United States Patent
Yamamoto et al.

(10) Patent No.: US 8,200,302 B2
(45) Date of Patent: Jun. 12, 2012

(54) MOBILE WIRELESS COMMUNICATION APPARATUS HAVING A PLURALITY OF ANTENNA ELEMENTS

(75) Inventors: Atsushi Yamamoto, Kyoto (JP); Hiroshi Iwai, Osaka (JP); Tsutomu Sakata, Osaka (JP); Yoshio Koyanagi, Ishikawa (JP); Toshiteru Hayashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 448 days.

(21) Appl. No.: 12/517,316

(22) PCT Filed: Sep. 30, 2008

(86) PCT No.: PCT/JP2008/002752
§ 371 (c)(1),
(2), (4) Date: Jul. 16, 2009

(87) PCT Pub. No.: WO2009/044540
PCT Pub. Date: Apr. 9, 2009

(65) Prior Publication Data
US 2010/0069017 A1    Mar. 18, 2010

(30) Foreign Application Priority Data
Oct. 2, 2007    (JP) ................. 2007-258654

(51) Int. Cl.
*H04M 1/00* (2006.01)
(52) U.S. Cl. .......... 455/575.7; 455/575.5; 370/339
(58) Field of Classification Search ..... 455/575.1–575.8
See application file for complete search history.

(56) References Cited

U.S. PATENT DOCUMENTS

| | | | |
|---|---|---|---|
| 6,999,793 B2 * | 2/2006 | Jinushi | 455/558 |
| 2004/0106428 A1* | 6/2004 | Shoji | 455/550.1 |
| 2005/0181847 A1* | 8/2005 | Boyle | 455/575.7 |

FOREIGN PATENT DOCUMENTS

| | | |
|---|---|---|
| EP | 1 763 145 | 3/2007 |
| JP | 62-154902 | 7/1987 |
| JP | 3-113516 | 11/1991 |
| JP | 6-1848 | 1/1994 |
| JP | 11-150415 | 6/1999 |
| JP | 2004-274223 | 9/2004 |
| JP | 2004-274730 | 9/2004 |
| JP | 2004-312381 | 11/2004 |
| JP | 2005-354322 | 12/2005 |
| JP | 3830773 | 7/2006 |
| JP | 2006-319864 | 11/2006 |
| WO | 2007/004499 | 1/2007 |

OTHER PUBLICATIONS

International Search Report issued Jan. 20, 2009 in the International (PCT) Application of which the present application is the U.S. National Stage.

* cited by examiner

*Primary Examiner* — Rafael Pérez-Gutiérrez
*Assistant Examiner* — Keith Fang
(74) *Attorney, Agent, or Firm* — Wenderoth, Lind & Ponack, L.L.P.

(57) ABSTRACT

A housing antenna is small enough in size so as to be accommodated in a mobile device. The antenna has a number of feeding points that allow the antenna to operate as a number of antenna elements. The antenna is capable of realizing high speed communication by increasing communication capacity.

17 Claims, 23 Drawing Sheets

(FRONT VIEW)　　　(SIDE VIEW)

(FRONT VIEW)　　　(SIDE VIEW)

MOBILE WIRELESS COMMUNICATION APPARATUS HAVING A PLURALITY OF ANTENNA ELEMENTS

TECHNICAL FIELD

The present invention relates to an antenna device, used for a wireless communication apparatus, which is controlled so as to realize high-speed communication by increasing communication capacity and to keep communication quality excellent in mobile communication using a mobile telephone and the like, and more particularly to a wireless communication apparatus having a MIMO antenna and/or an adaptive array antenna.

BACKGROUND ART

As an antenna device for which a MIMO (Multi-Input Multi-Output) technique of transmitting and receiving wireless signals of a plurality of channels at the same time by using a plurality of antennas is adopted, there exists a MIMO antenna device disclosed in Patent Document 1, for example.

The conventional MIMO antenna device disclosed in Patent Document 1 includes four antenna element groups located at equal intervals and a main body section. Each of the antenna element groups includes four antenna elements which have polarization directions different from each other. On the other hand, the main body section includes: a switch section connected to the antenna elements; a signal receiving section for receiving a reception signal via the switch section; an antenna control section for generating a control signal for the switch section; an antenna selection section for generating combinations of the antenna elements and to notify the antenna control section of information of the selected element; and an antenna determination section for specifying a particular combination of the antenna elements based on the reception signal received by the antenna elements included in the combinations generated by the antenna selection section, and to notify the antenna control section of information of the specified element.

This conventional MIMO antenna device having the above configuration is used for reducing correlation among the antenna elements and ensuring sufficient transmission capacity, by specifying a combination of the antenna elements so as to select one antenna element from each of the antenna element groups.

That is, in the conventional MIMO antenna device, a plurality of antenna elements are operated concurrently and then each of the antenna elements obtains as large amount of received electric power as possible, thereby increasing total transmission rate of a plurality of signal sequences to which MIMO demodulation has been performed. In order to achieve this, the MIMO antenna device disclosed in Patent Document 1 includes more antenna elements than channels of simultaneous communication performed by the MIMO antenna device, and among the antenna elements, antenna elements which are receiving signals having large intensities are selected so as to perform MIMO demodulation.

Selecting antenna elements as described above is effective especially in a case where, in a mobile communication, due to movement of a mobile station (a user) or temporal variation of an ambient environment, signal intensities of a main polarized wave and a cross polarized wave temporally vary or the arrival angles vary. Moreover, variation of polarization direction can be dealt with by using antenna elements having polarization characteristics different from each other, and the temporal variation can be resolved by performing control so as to switch among the antenna elements.

As described above, the MIMO antenna device disclosed in Patent Document 1 includes a plurality of antenna element groups each including a plurality of antenna elements, and, by using the switch section, selects a combination of the antenna elements having minimum correlation thereamong or selects a combination of the antenna elements having maximum transmission capacity, thereby enabling reduction of correlation among the antenna elements and enhancement of transmission capacity.

Next, with reference to Patent Documents 2 and 3, one example of mobile wireless apparatuses a part of which is used as an antenna will be described.

In a mobile wireless apparatus disclosed in Patent Document 2, a part of the housing conductor of the mobile wireless apparatus is caused to operate as a part of an antenna such that dedicated components for antennas are not needed, the number of pieces of components is reduced to decrease the manufacturing cost, and thinned size and reduced weight of the device are obtained. Moreover, using the housing as an antenna enables the size of an antenna to be increased, and then it is expected that the sensitivity of an antenna is enhanced. As described above, when the mobile wireless apparatus disclosed in Patent Document 2 is used for a mobile terminal which is desired to be miniaturized, the mobile wireless apparatus causes the housing conductor to operate as a part of an antenna, thereby improving the quality of wireless communication.

A mobile telephone disclosed in Patent Document 3 is used for reducing gain fluctuation depending on a state of a hand of a user. Patent Document 3 discloses a configuration that in a flip-type telephone 1, a shield box 14 in an upper housing 3 and an output terminal of a transmission circuit 15 in a lower housing 4 are connected to each other by a flexible cable 9 and the shield box 14 is used as an antenna (FIG. 3 in Patent Document 3). Thus, by using the shield box 14 as an antenna, gain fluctuation depending on a state of a hand of a user can be reduced.

Next, with reference to Patent Document 4, one example of a ¼ wavelength one-end-short-circuited patch antenna having a small ground plane will be described.

The ¼ wavelength one-end-short-circuited patch antenna disclosed in Patent Document 4 enables the size of a ground plane to be reduced, so that the bandwidth of the antenna can be increased and the size of a wireless apparatus can be reduced. The ¼ wavelength one-end-short-circuited patch antenna has a feature that, particularly in a miniaturized mobile wireless apparatus such as a pager, gain reduction due to approach of an electric circuit and a human body is suppressed owing to a thinned patch structure, and the size and the weight thereof are substantially reduced. That is, the antenna of the conventional art is suitable as an antenna for a miniaturized mobile wireless apparatus, and in mobile terminals which are desired to be miniaturized, it is expected that a miniaturized and thinned patch structure improves the quality of wireless communication.

[Patent Document 1] Japanese Laid-Open Patent Publication No. 2004-312381

[Patent Document 2] Japanese Laid-Open Patent Publication No. 2004-274730

[Patent Document 3] Japanese Patent Specification No. 3830773

[Patent Document 4] Japanese Examined Patent Publication No. 6-1848

SUMMARY OF THE INVENTION

Problems to be Solved by the Invention

However, the conventional MIMO antenna device disclosed in Patent Document 1 has problems as follows.

As described above, in order to obtain as large amount of received electric power as possible, this conventional MIMO antenna device includes more antenna elements than channels of simultaneous communication performed by the MIMO antenna device, and selects, from the antenna elements, antenna elements in which intensities of the reception signals are large and then performs MIMO demodulation. However, if a plurality of antenna element groups are mounted in miniaturized apparatuses each having a size equal to or smaller than one wavelength such as mobile telephones, the intervals among the antennas are reduced. Therefore, since MIMO communication is performed by using arrays formed by antennas having the same polarization direction, there arises a problem that radiation efficiency is deteriorated due to mutual coupling among antennas.

On the other hand, the conventional mobile wireless apparatus disclosed in Patent Document 2 has problems as follows.

In this conventional mobile wireless apparatus, miniaturization by using a part of the housing conductor as an antenna is intended, and it is suggested that a structure suitable for operation using one antenna or for diversity operation performed by switching between the antenna and a slot antenna. However, only one of the antennas is operated in the switching diversity, and mutual coupling among antennas does not occur as a problem. Therefore, an antenna structure for reducing mutual coupling is not considered. That is, in a MIMO antenna or an adaptive array antenna, which requires a plurality of antennas that are operated concurrently, the mobile wireless apparatus disclosed in Patent Document 2 cannot be used for a MIMO antenna.

Further, in the mobile telephone disclosed in Patent Document 3 and the conventional antenna disclosed in Patent Document 4, it is assumed that only one antenna is operated, and a MIMO antenna or an adaptive array antenna, in which a plurality of antennas are operated concurrently, is not considered.

Therefore, an object of the present invention is to provide a wireless communication apparatus, used for a mobile apparatus, which enables mutual coupling among antennas to be suppressed such that even if the size of the apparatus is small, a plurality of power feeding antenna elements concurrently keep excellent reception states.

Solution to the Problems

The present invention is directed to a mobile wireless communication apparatus having a plurality of antenna elements. In order to attain the object mentioned above, a mobile wireless communication apparatus according to one aspect of the present invention comprises: a first conductor section; a second conductor section arranged in parallel with and spaced from the first conductor section so as to have a predetermined distance therebetween; a short-circuit conductor section electrically connecting one edge of the first conductor section to one edge of the second conductor section that is facing the one edge of the first conductor section; a ground conductor section spaced by a predetermined distance from the first conductor section; and a wireless communication circuit, and a first feeding point on the first conductor section is connected to the wireless communication circuit via a first power supply section provided between the first conductor section and the ground conductor section so that the first conductor section and the ground conductor section are allowed to operate as a first antenna element, and a second feeding point on the second conductor section is connected to the wireless communication circuit via a second power supply section provided between the first conductor section and the second conductor section so that the first conductor section, the second conductor section, and the short-circuit conductor section are allowed to operate as a second antenna element.

If a total length of: a path length passing from one edge of the second conductor section which is connected to the short-circuit conductor section, through the second feeding point, to an open edge of the second conductor section which is opposed to the one edge; and a length of the short-circuit conductor section, between the first conductor section and the second conductor section, is set to be a ¼ length of a wavelength of a communication signal, the second antenna element can be operated as a ¼ wavelength one-end-short-circuited patch antenna. A part of a housing of the mobile wireless communication apparatus, the housing being formed by a conductive material, may be used as the first conductor section. The wireless communication circuit may be mounted on the first conductor section.

It is noted that in a case where it is desired that one second antenna element is operated at two different frequencies, two short-circuit conductor sections corresponding to the respective frequencies may be provided so as to perform switching therebetween. In this case, a parallel resonance circuit formed by an inductor and a capacitor, a switching circuit controlled by a control section, or the like can be used for the short-circuit conductor sections.

If the mobile wireless communication apparatus of the present invention further comprises: an adaptive control circuit for performing adaptive control processing to wireless signals received by the first and the second antenna elements and to combine wireless signals to which the adaptive control processing has been performed; a demodulation circuit for demodulating, while demodulating a wireless signal which has been obtained by the combining, a wireless signal received by the first antenna element alone and a wireless signal received by the second antenna element alone; and an apparatus control circuit for controlling the adaptive control circuit to compare a signal integrity of a signal obtained by demodulating the wireless signal which has been obtained by the combining, with respective signal integrities of signals obtained by demodulating the wireless signals which have been received by the first antenna element alone and the second antenna element alone, so as to receive a wireless signal having a signal integrity which has been determined to be optimum through the comparison, the mobile wireless communication apparatus of the present invention can be operated as an adaptive antenna.

If the mobile wireless communication apparatus of the present invention further comprises: a first processing circuit for performing adaptive control processing to wireless signals received by the first and the second antenna elements; a second processing circuit for performing selective diversity processing to the wireless signals received by the first and the second antenna elements; and a selection circuit for comparing a signal integrity of a wireless signal outputted from the first processing circuit, with a signal integrity of a wireless signal outputted from the second processing circuit, so as to select, from the outputted wireless signals, a signal having an preferable signal integrity and output the selected signal, the mobile wireless communication apparatus of the present invention can be operated as a selective diversity antenna.

If the mobile wireless communication apparatus of the present invention further comprises: an adaptive control circuit for performing adaptive control processing to wireless signals received by the first and the second antenna elements and to combine wireless signals to which the adaptive control processing has been performed; and an apparatus control circuit for detecting phases and amplitudes of the wireless signals received by the first and the second antenna elements, and to control the adaptive control circuit so as to perform maximum ratio combining to the wireless signals, the mobile wireless communication apparatus of the present invention can be operated as a combining diversity antenna.

If the mobile wireless communication apparatus of the present invention further comprises a MIMO demodulation circuit for performing MIMO demodulation processing to wireless signals received by the first and the second antenna elements so as to output one demodulated signal, the mobile wireless communication apparatus of the present invention can be operated as a MIMO antenna.

Effect of the Invention

According to the present invention described above, it becomes possible to realize an array antenna for a small-sized terminal without substantially increasing the number of components of antennas. Moreover, by using a housing as an antenna, it becomes possible to substantially increase a size of an antenna. Moreover, by locating a plane of a short-circuited side of a ¼ wavelength one-end-short-circuited patch antenna so as to face a power supply section of a housing antenna, reduction of mutual coupling between the antennas can be realized. Moreover, by locating components such that the radiation directivities of the antennas are different from each other, a correlation coefficient between the antennas can be decreased. Thus, it is expected that performance as an array antenna improves, and operation of a MIMO antenna and/or an adaptive array antenna can be improved.

Figure 1:
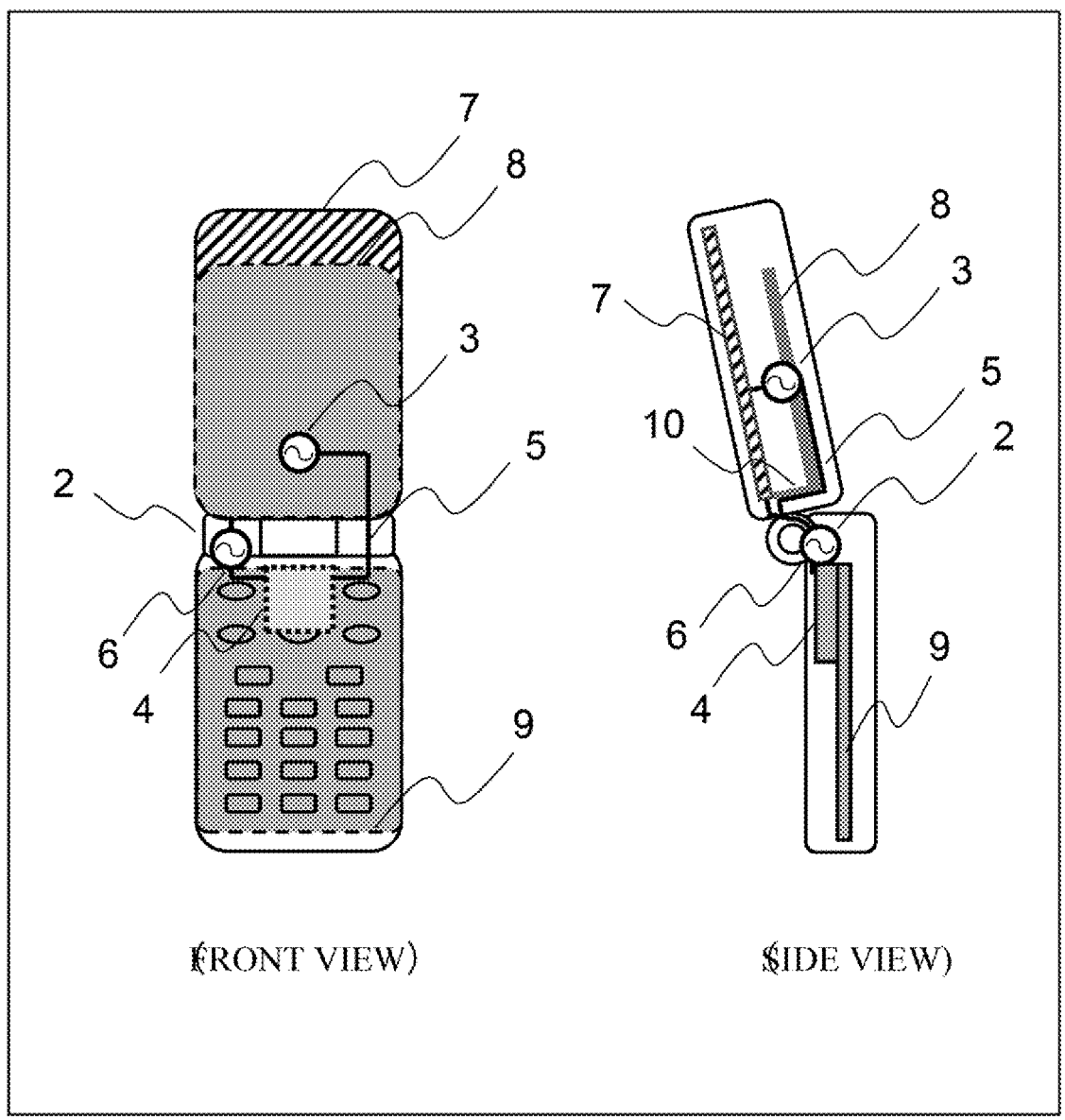
FIG. 1 is a diagram illustrating an internal structure of a mobile wireless communication apparatus according to a first embodiment of the present invention.

DESCRIPTION OF THE REFERENCE CHARACTERS 2, 3, 3a power supply section
4 wireless communication circuit
5, 6 power feeding line
7, 8 conductor section
9 ground conductor section
10, 33a, 33b short-circuit conductor section
20 housing antenna
30 one-end-short-circuited patch antenna
41 inductor
42 capacitor
43 switch
100a to 100d, 201, 202, 401a to 401c, 501a to 501c, 507 antenna element
101, 502 A/D conversion circuit
102 adaptive control circuit
103, 405, 505 controller
104a to 104d, 402a to 402c variable amplifier
105a to 105d, 403a to 403c variable phase shifter
106, 406 signal combining device
107 demodulator
109 determiner 203, 204 processing circuit
205, 206 detector
207 signal integrity monitor circuit
208 selection circuit
404a to 404c reception signal detector
503 MIMO demodulation circuit
504 signal level comparison circuit
506 wireless transmission circuit

DETAILED DESCRIPTION OF THE INVENTION

Hereinafter, embodiments of the present invention will be described in detail with reference to the drawings. It is noted that in all of the drawings for the embodiments of the present invention, components having similar operations will be denoted by the same reference numerals, and repetition of description thereof is omitted.

(First Embodiment)

FIG. 1 is a front view and a side view illustrating an internal structure of a mobile wireless communication apparatus according to a first embodiment of the present invention. In FIG. 1, the mobile wireless communication apparatus according to the first embodiment includes first and second power supply sections 2 and 3, a wireless communication circuit 4, first and second power feeding lines 6 and 5, first and second conductor sections 7 and 8, a ground conductor section 9, and a short-circuit conductor section 10.

The mobile wireless communication apparatus according to the first embodiment includes, in antenna array formation, a housing antenna in which a part of a housing conductor is used as an antenna, and a ¼ wavelength one-end-short-circuited patch antenna in which a part of the housing conductor is used as a ground plane. The first power supply section 2 is a power supply section for supplying power to the housing antenna via the first power feeding line 6. The second power supply section 3 is a power supply section for supplying power to the ¼ wavelength one-end-short-circuited patch antenna via the second power feeding line 5. The first and the second power supply sections 2 and 3 are connected to the wireless communication circuit 4, thereby enabling wireless communication. The wireless communication circuit 4 includes a high-frequency circuit such as a filter, an amplifier, or a frequency conversion mixer, and baseband circuits such as a modulator and a demodulator.

Firstly, operation of a housing antenna 20 will be described with reference to FIG. 2 and FIG. 3, and operation of a ¼ wavelength one-end-short-circuited patch antenna 30 will be described with reference to FIG. 4 and FIG. 5.

Figure 2:
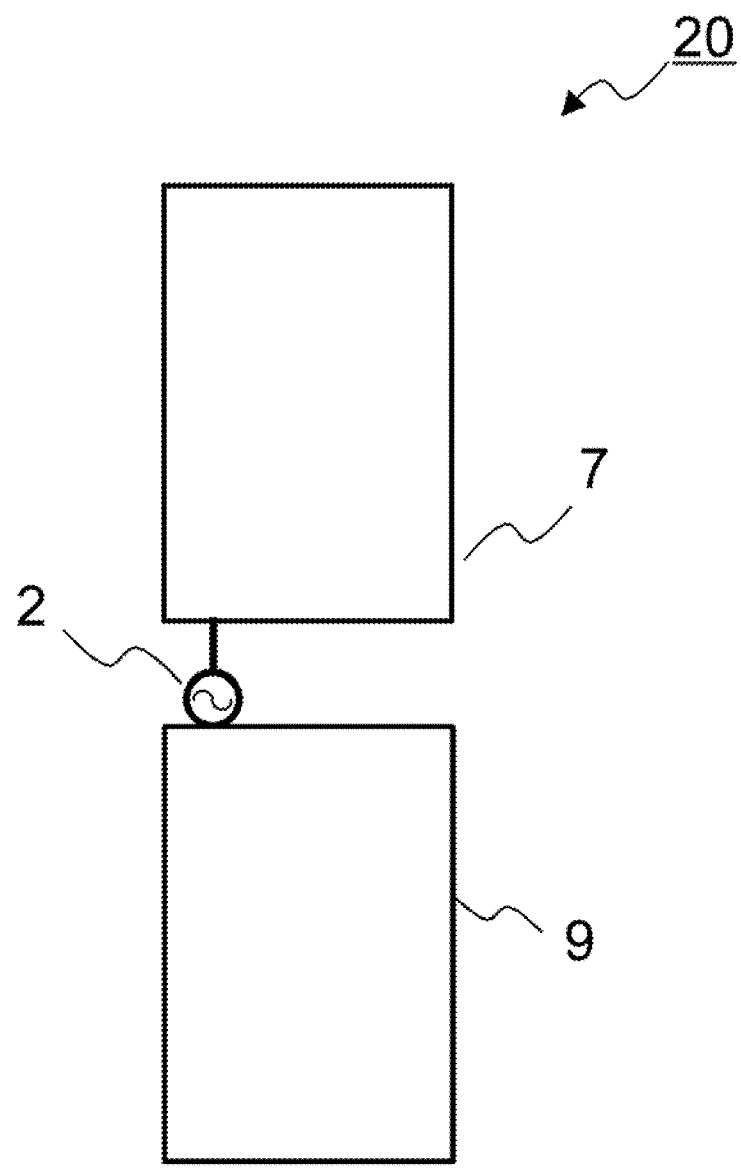
FIG. 2 is a diagram illustrating a structure of a housing antenna 20.

FIG. 2 shows a schematic structure of the housing antenna 20. The housing antenna 20 includes the first conductor section 7, the ground conductor section 9, and the first power supply section 2. The first conductor section 7 is a ground plane of an upper housing of a flip-type telephone. The ground conductor section 9 is a ground plane of a lower housing of the flip-type mobile telephone. The first power supply section 2 is provided at a hinge portion connecting between the first conductor section 7 and the ground conductor section 9.

Figure 3:
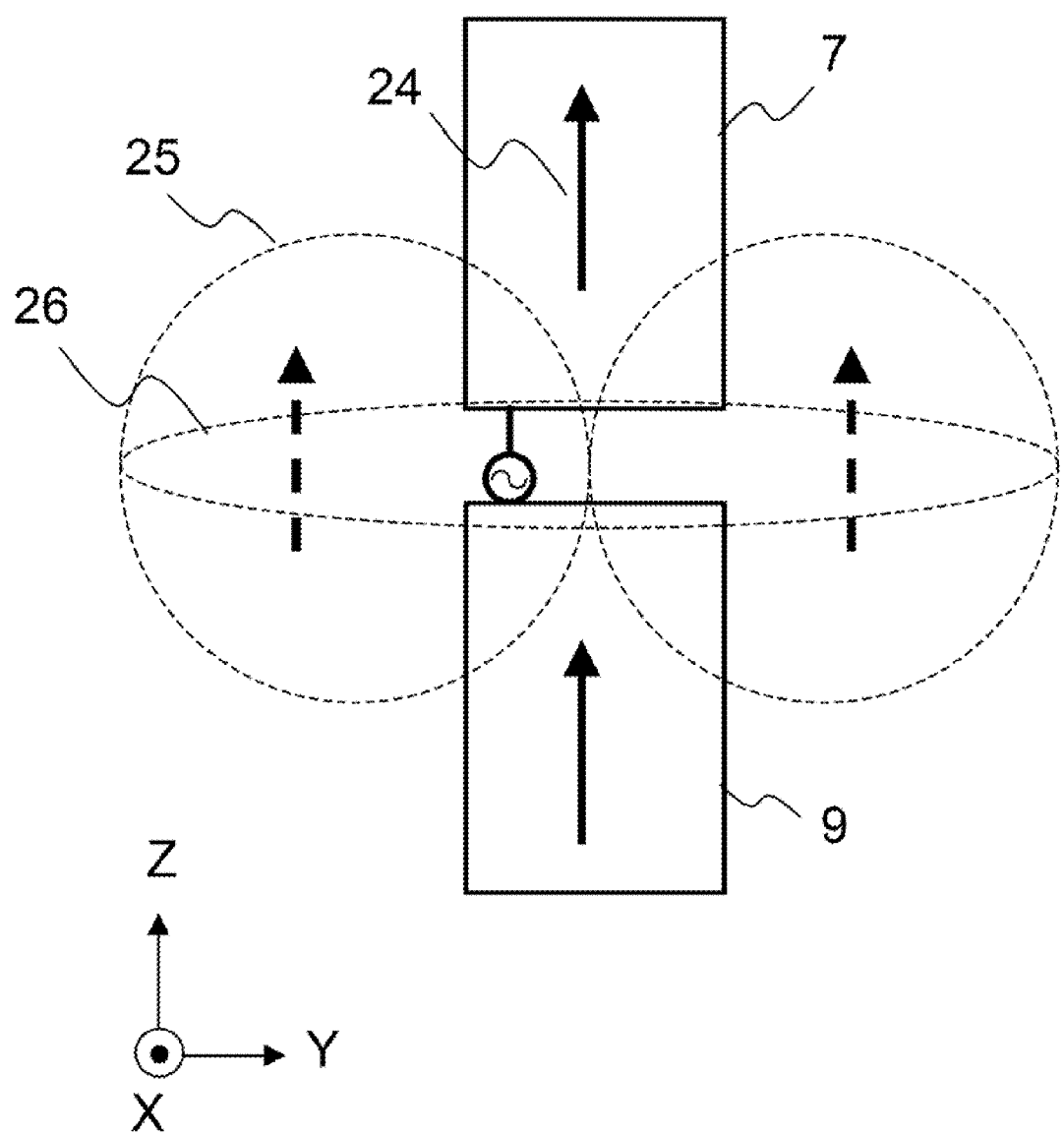
FIG. 3 is a schematic diagram illustrating a direction of an electric current, a direction of an electric field, and a radiation pattern in the housing antenna 20.

FIG. 3 shows a schematic diagram illustrating a direction of an electric current, a direction of an electric field, and a radiation pattern, in the housing antenna 20. As shown in FIG. 3, in the housing antenna 20, a high-frequency electric current 24 flows through the first conductor section 7 and the ground conductor section 9, whereby a wireless wave is radiated. The electric current flows in the same manner as in a dipole antenna. Therefore, the radiation directivity of the housing antenna 20 is obtained such that a figure-of-eight directivity 25 is obtained on the plane of the paper (ZY plane), and a non-directivity is obtained on a plane (XY plane) perpendicular to the plane of the paper. It is noted that an electric field direction 26 of a radiated wireless wave is parallel with a direction of the high-frequency electric current 24.

Figure 4:
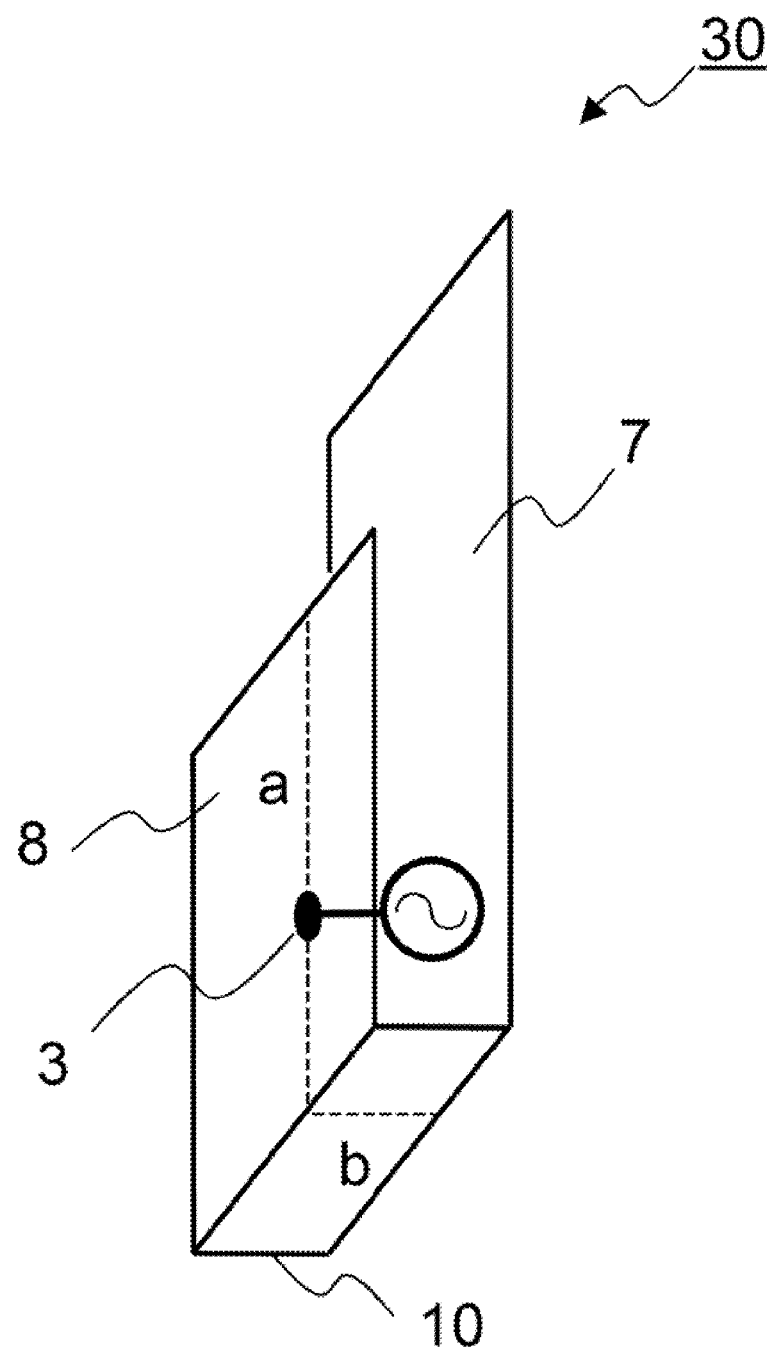
FIG. 4 is a diagram illustrating a structure of a ¼ wavelength one-end-short-circuited patch antenna 30.

FIG. 4 shows a schematic structure of the ¼ wavelength one-end-short-circuited patch antenna 30. The ¼ wavelength one-end-short-circuited patch antenna 30 includes the first conductor section 7, the second conductor section (upper conductor section) 8, the short-circuit conductor section 10, and the second power supply section 3. The first conductor section 7 is located apart from the second conductor section 8 by a predetermined distance in parallel therewith, and via the short-circuit conductor section 10 having a width corresponding to the predetermined distance, a short side of the first conductor section 7 and a short side of the second conductor section 8 are electrically connected to each other. It is noted that the short-circuit conductor section 10 may be provided so as to connect the long side of the first conductor section 7 to the long side of the second conductor section 8. The second power supply section 3 performs power feeding between the first conductor section 7 and the second conductor section 8. In the ¼ wavelength one-end-short-circuited patch antenna 30, a total length of: a long-side distance (dashed line a), of the second conductor section 8, passing through a power feeding point of the second power supply section 3; and a short-side distance (dashed line b) of the short-circuit conductor section 10, is determined to be a ¼ length of a communication signal wavelength.

Figure 5:
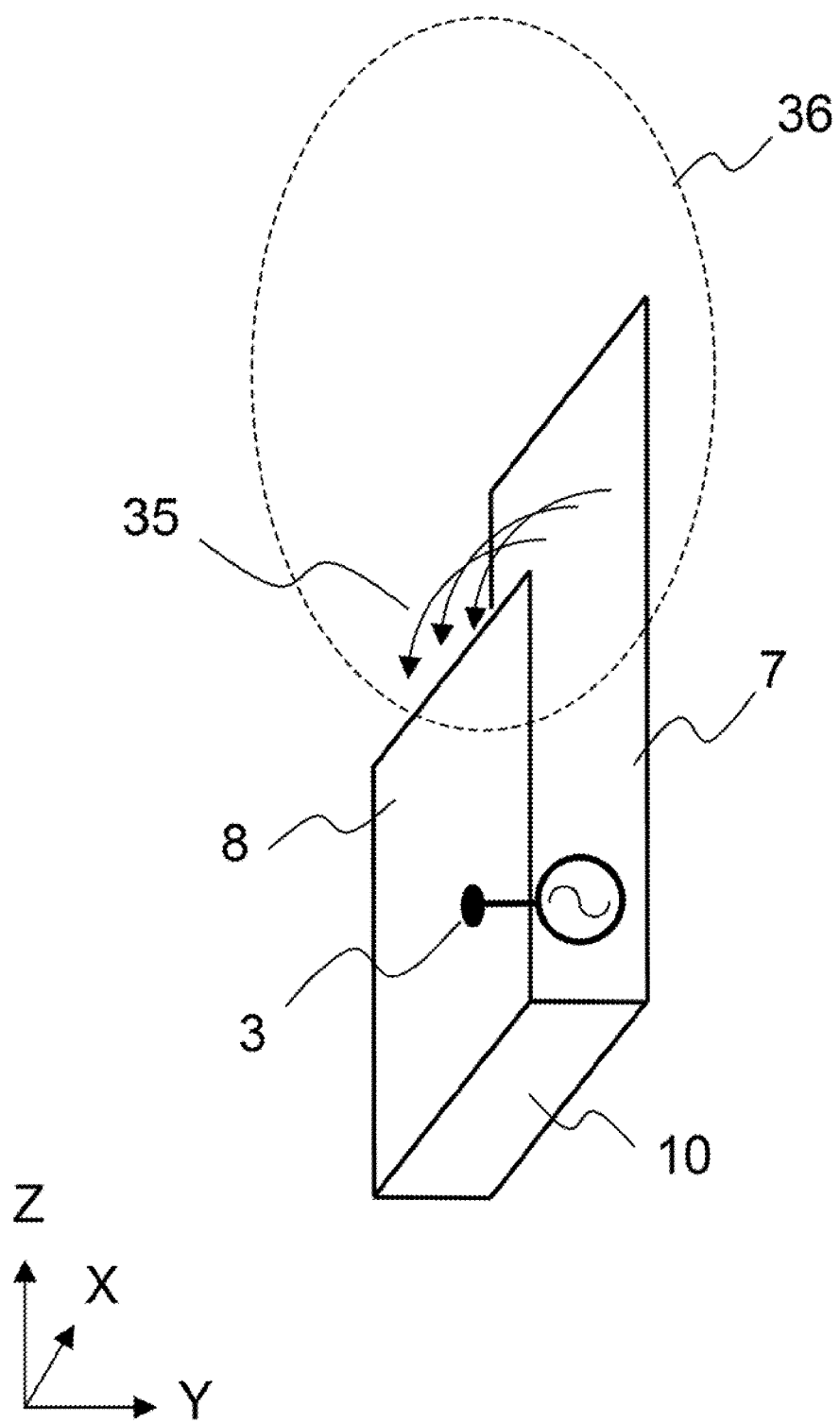
FIG. 5 is a schematic diagram illustrating a direction of an electric field and a radiation pattern excited by the ¼ wavelength one-end-short-circuited patch antenna 30.

FIG. 5 is a schematic diagram illustrating a direction of an electric field and a radiation pattern excited by the ¼ wavelength one-end-short-circuited patch antenna 30. As shown in FIG. 5, in the ¼ wavelength one-end-short-circuited patch antenna 30, an electric field 35 is generated between the first conductor section 7 and the second conductor section 8 due to the power feeding by the second power supply section 3, and the short-circuit conductor section 10 operates as a reflector plate. Therefore, a radiation directivity 36 which is enhanced in the Z direction is obtained.

Next, with reference to FIG. 6 to FIG. 11, a production sample of each of the housing antenna 20 and the ¼ wavelength one-end-short-circuited patch antenna 30 will be described.

Figure 6:
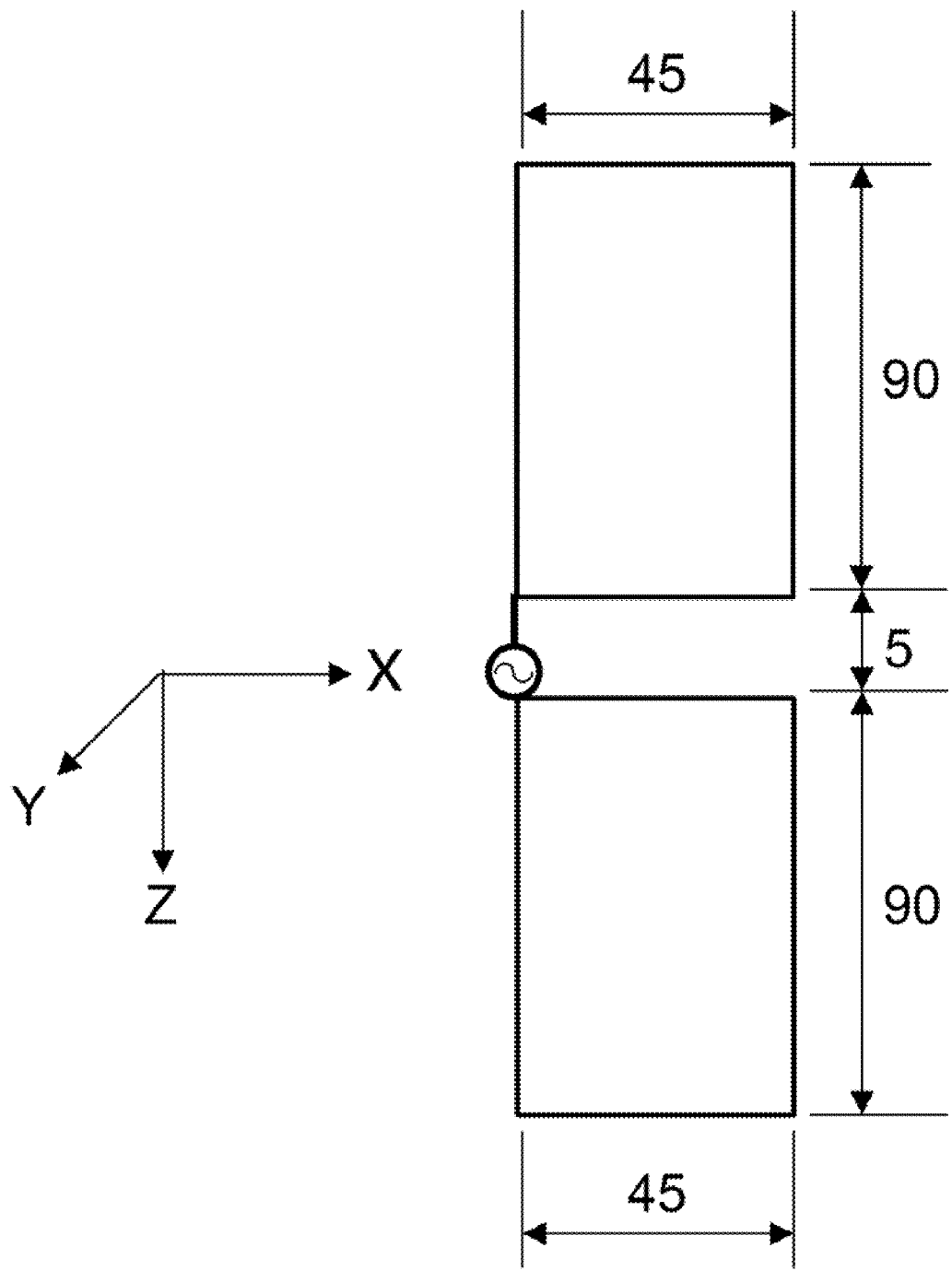
FIG. 6 is a diagram illustrating a production sample of the housing antenna 20.
Figure 7:
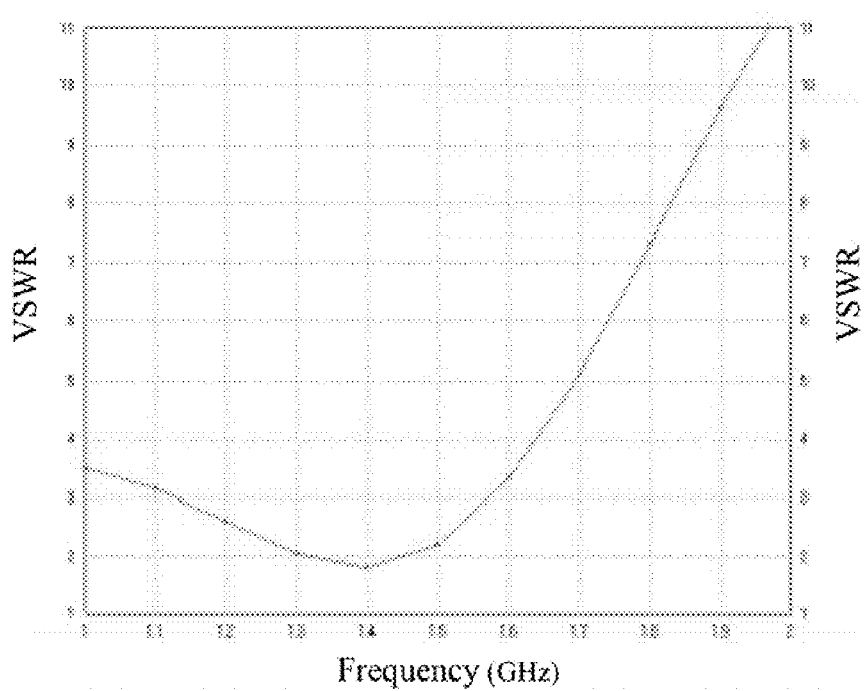
FIG. 7 is a diagram illustrating an impedance characteristic of the housing antenna 20 shown in FIG. 6.
Figure 8:
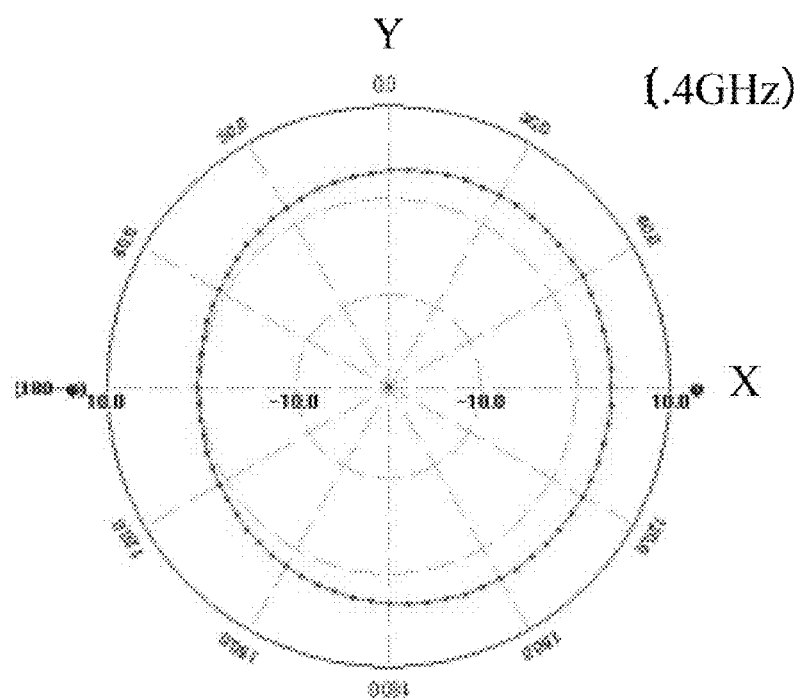
FIG. 8 is a diagram illustrating a radiation pattern of the housing antenna 20 shown in FIG. 6.

FIG. 6 shows a production sample of the housing antenna 20. In this production sample, each shape of the first conductor section 7 and the ground conductor section 9 is a rectangle of 45 mm×90 mm, and a length between the first conductor section 7 and the ground conductor section 9 is 5 mm. In addition, FIG. 7 and FIG. 8 show an impedance characteristic (Input VSWR) and a radiation pattern (XY plane). As shown in FIG. 7, it is found that in the housing antenna 20, a resonance occurs at 1.4 GHz. FIG. 8 shows a radiation pattern obtained in a case where the frequency is 1.4 GHz. As shown in FIG. 8, it is found that a directivity which is slightly enhanced in the X direction is obtained. This is because the power supply section is located in a non-symmetrical position of the antenna. However, a non-directivity is almost obtained.

Figure 9:
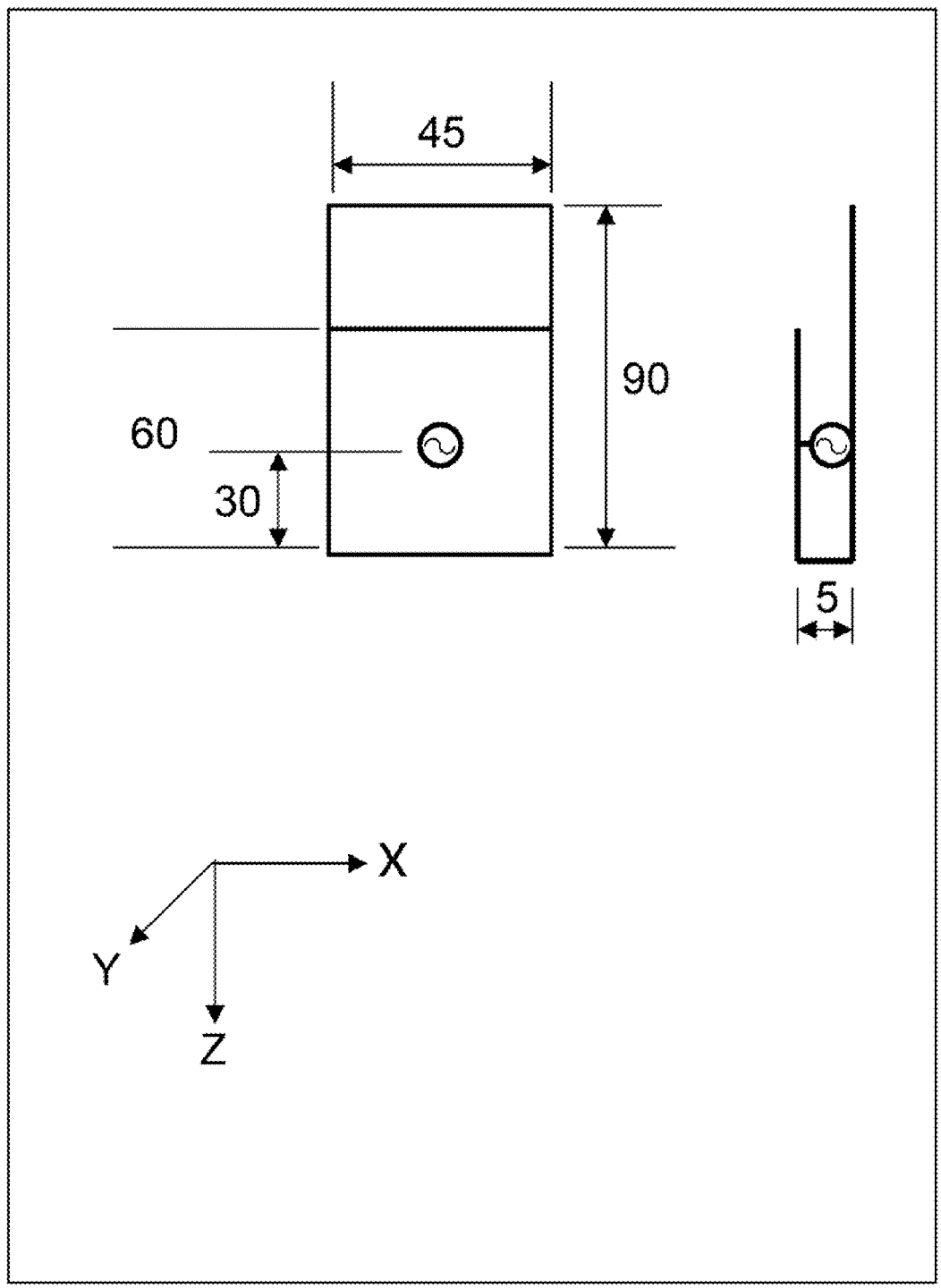
FIG. 9 is a diagram illustrating a production sample of the ¼ wavelength one-end-short-circuited patch antenna 30.
Figure 10:
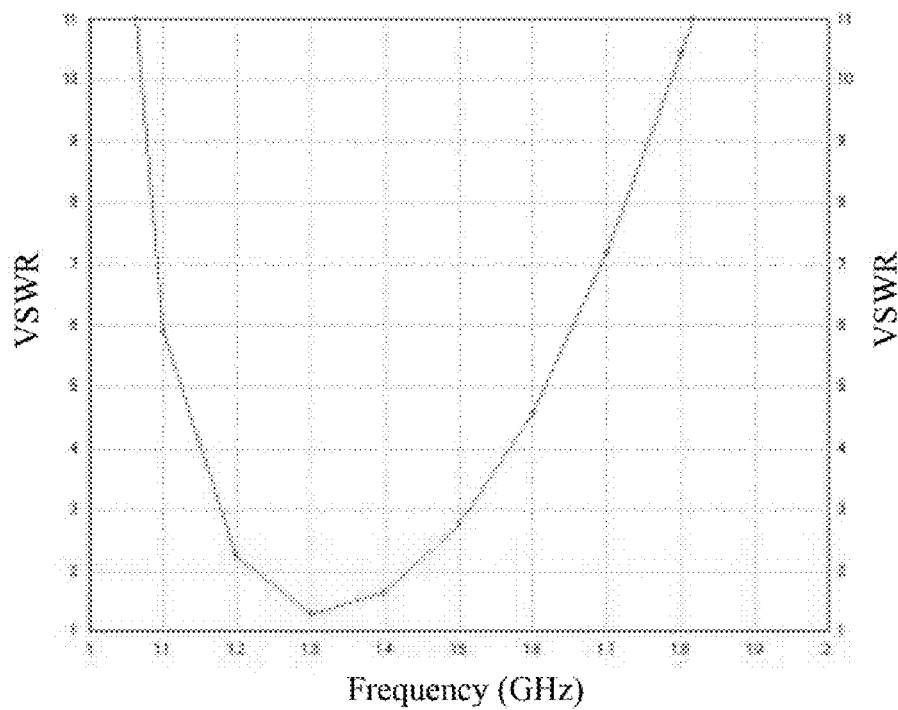
FIG. 10 is a diagram illustrating an impedance characteristic of the ¼ wavelength one-end-short-circuited patch antenna 30 shown in FIG. 9.
Figure 11:
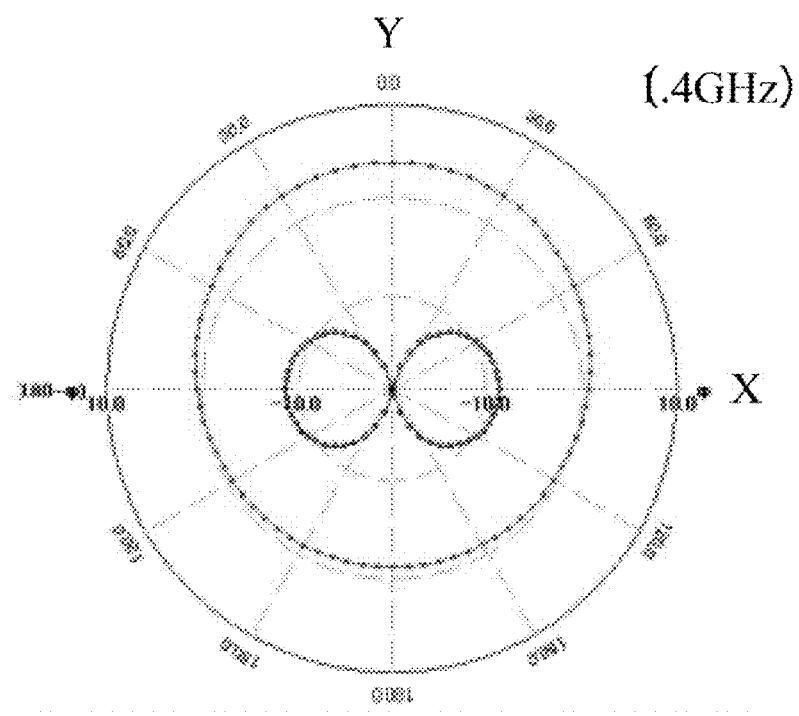
FIG. 11 is a diagram illustrating a radiation pattern of the ¼ wavelength one-end-short-circuited patch antenna 30 shown in FIG. 9.

FIG. 9 shows a production sample of the ¼ wavelength one-end-short-circuited patch antenna 30. In this production sample, the first conductor section 7 is a rectangle of 45 mm×90 mm, the second conductor section 8 is a rectangle of 45 mm×60 mm, and the short-circuit conductor section 10 is a rectangle of 45 mm×5 mm. In addition, FIG. 10 and FIG. 11 show an impedance characteristic (Input VSWR) and a radiation pattern (XY plane). As shown in FIG. 10, it is found that in the ¼ wavelength one-end-short-circuited patch antenna 30, a resonance occurs at 1.3 GHz. Since a wavelength is 231 mm at 1.3 GHz, a ¼ wavelength is 58 mm and thus the length of the long side of the second conductor section 8=60 mm is almost satisfied. Moreover, the VSWR is near to "1" even in a case where the frequency is 1.4 GHz, and thus it is found that a preferable impedance characteristic is obtained. FIG. 11 shows a radiation pattern obtained in a case where the frequency is 1.4 GHz. As shown in FIG. 11, it is found that a directivity which is slightly enhanced in the Y direction is obtained. This is because the short-circuit conductor section 10 operates as a reflector plate as shown in FIG. 5.

As described above, since the housing antenna 20 and the ¼ wavelength one-end-short-circuited patch antenna 30 have radiation directivities different from each other, it is supposed that a correlation coefficient between the antennas is small. Accordingly, it is expected that a preferable array characteristic as a MIMO antenna, an adaptive array antenna, an array antenna of maximum ratio combining, or the like is obtained.

Next, an antenna array including, in combination, the housing antenna 20 and the ¼ wavelength one-end-short-circuited patch antenna 30, will be described.

Figure 12:
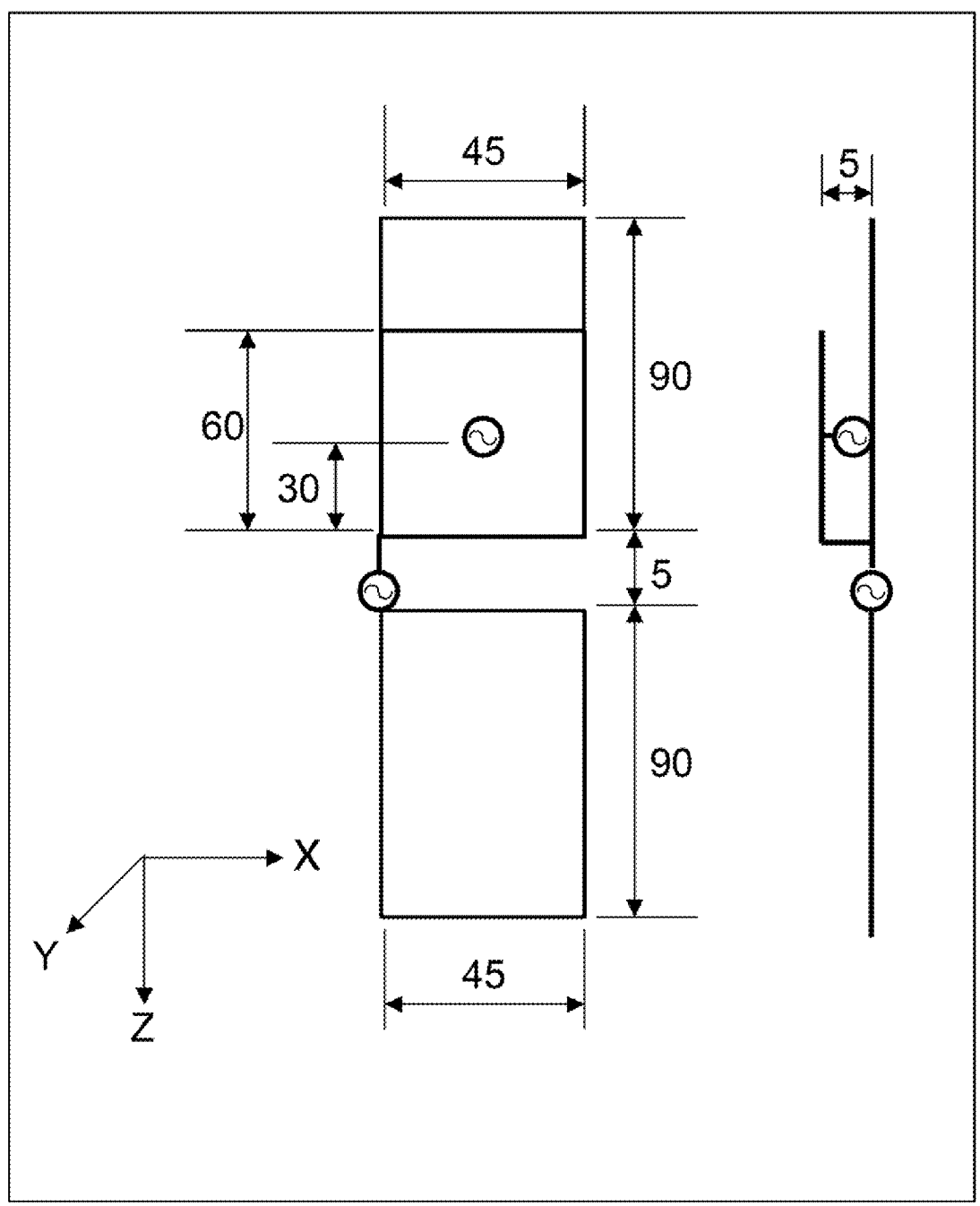
FIG. 12 is a diagram illustrating a production sample of an antenna array including both the antennas in combination.

FIG. 12 shows a production sample of the antenna array including, in combination, the housing antenna 20 in FIG. 6 and the ¼ wavelength one-end-short-circuited patch antenna 30 in FIG. 9. In addition, FIG. 13 shows impedance characteristics (Input VSWR) of both of the antennas, and FIG. 14 shows reflection characteristics and a mutual coupling characteristic (passing characteristic of the antennas) of both of the antennas.

Figure 13:
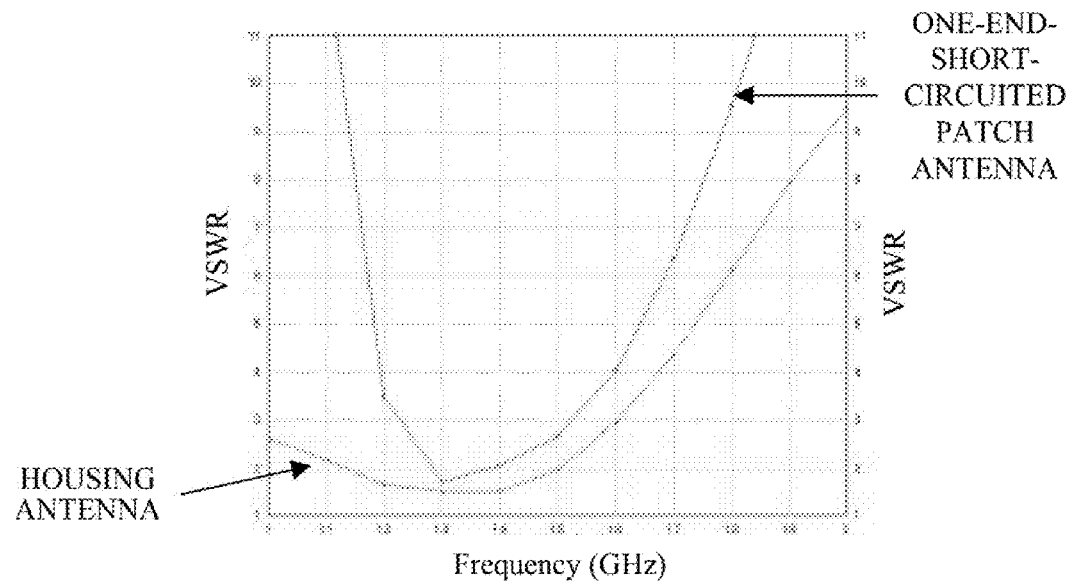
FIG. 13 is a diagram illustrating an impedance characteristic of the antenna array shown in FIG. 12.
Figure 14:
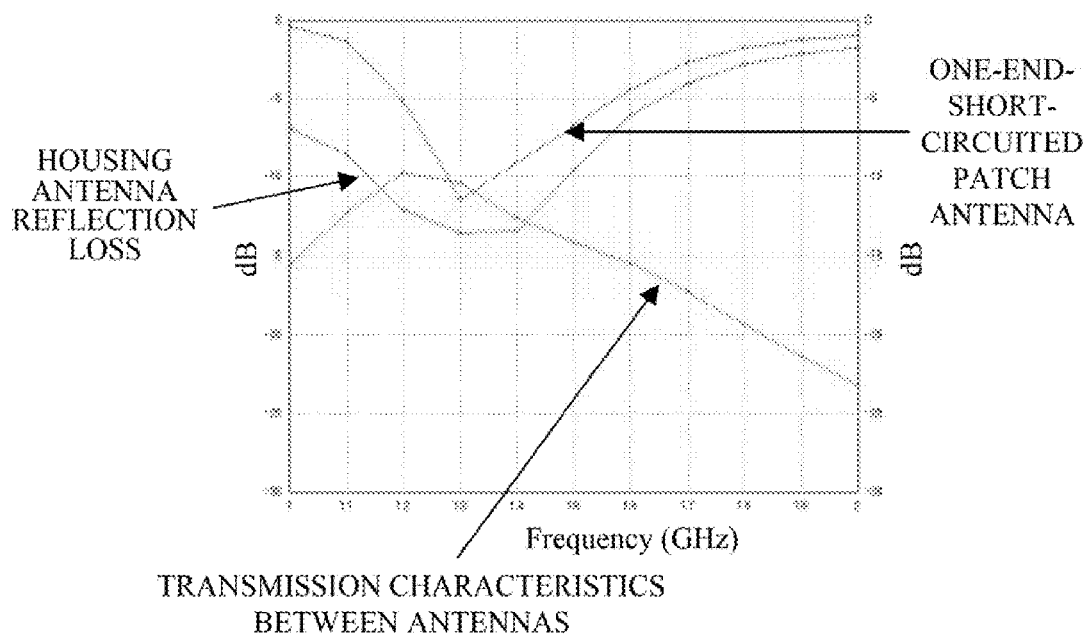
FIG. 14 is a diagram illustrating reflection characteristics and a mutual coupling characteristic of the antenna array shown in FIG. 12.

As shown in FIG. 13, it is found that in the antenna array, a resonance occurs at 1.3 GHz. Comparing FIG. 13 with FIG. 7 and FIG. 10, it is found that the difference between an impedance characteristic of the antenna array and the impedance characteristic of each of the antennas is small. That is, the two antennas forming the antenna array are hardly affected by each other. This is because the shielding effect improves owing to the short-circuit conductor section 10 being provided between the first power supply section 2 of the housing antenna 20 and the second power supply section 3 of the ¼ wavelength one-end-short-circuited patch antenna 30.

Therefore, it becomes possible to individually design antennas, thereby providing an effect that ease of designing increases. Moreover, as shown in FIG. 14, it is found that the mutual coupling characteristic represents −10 dB or smaller value. Accordingly, power which is absorbed from one antenna to the other antenna is equal to or smaller than ¹⁄₁₀ of power of the one antenna, and decrease of radiation efficiency of one antenna is equal to or smaller than −0.5 dB, thus preferable radiation efficiency with low deterioration can be realized.

Figure 15:
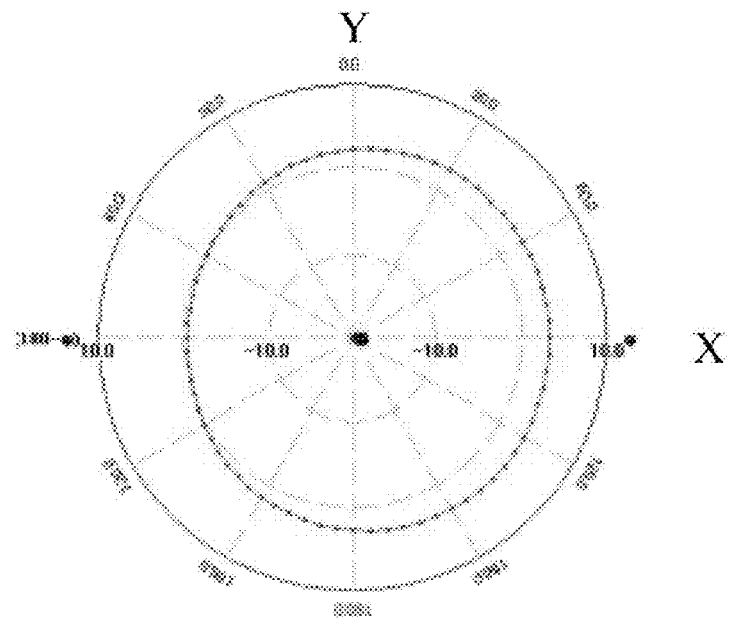
FIG. 15 is a diagram illustrating a radiation directivity of the housing antenna 20 in the antenna array.
Figure 16:
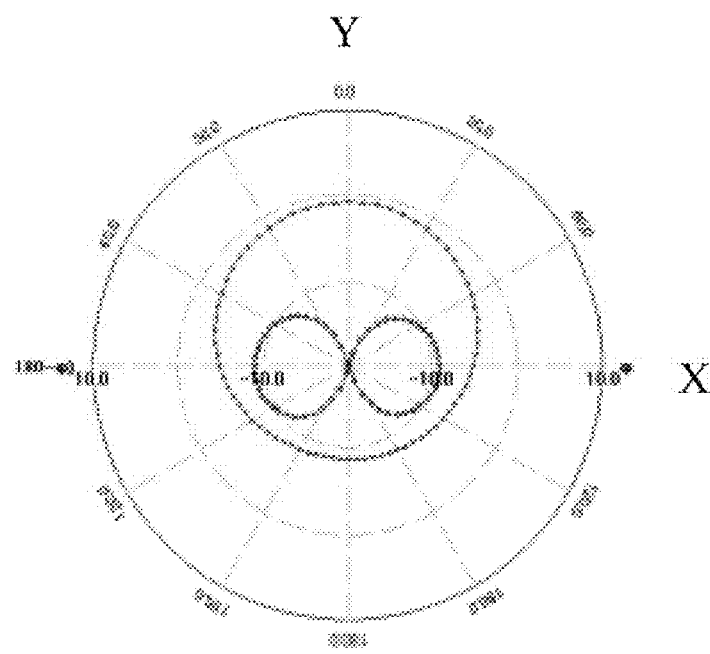
FIG. 16 is a diagram illustrating a radiation directivity of the ¼ wavelength one-end-short-circuited patch antenna 30 in the antenna array.

FIG. 15 and FIG. 16 show radiation directivities of the housing antenna 20 and the ¼ wavelength one-end-short-circuited patch antenna 30 in a case where an antenna array is formed. In comparison with a case where one antenna is used as it is, a radiation directivity of the ¼ wavelength one-end-short-circuited patch antenna 30 is slightly weakened in FIG. 16. However, both of the ¼ wavelength one-end-short-circuited patch antenna 30 and the housing antenna 20 have similar directivities to that obtained in a case where each of the antennas is used as it is, and thus it is found that variation of directivity caused by forming an antenna array is small.

As described above, the mobile wireless communication apparatus according to the first embodiment of the present invention can realize an antenna in which mutual coupling between antennas is small and a preferable array characteristic having different directivities is obtained, and which is optimum for a small-sized mobile wireless apparatus.

Figure 17:
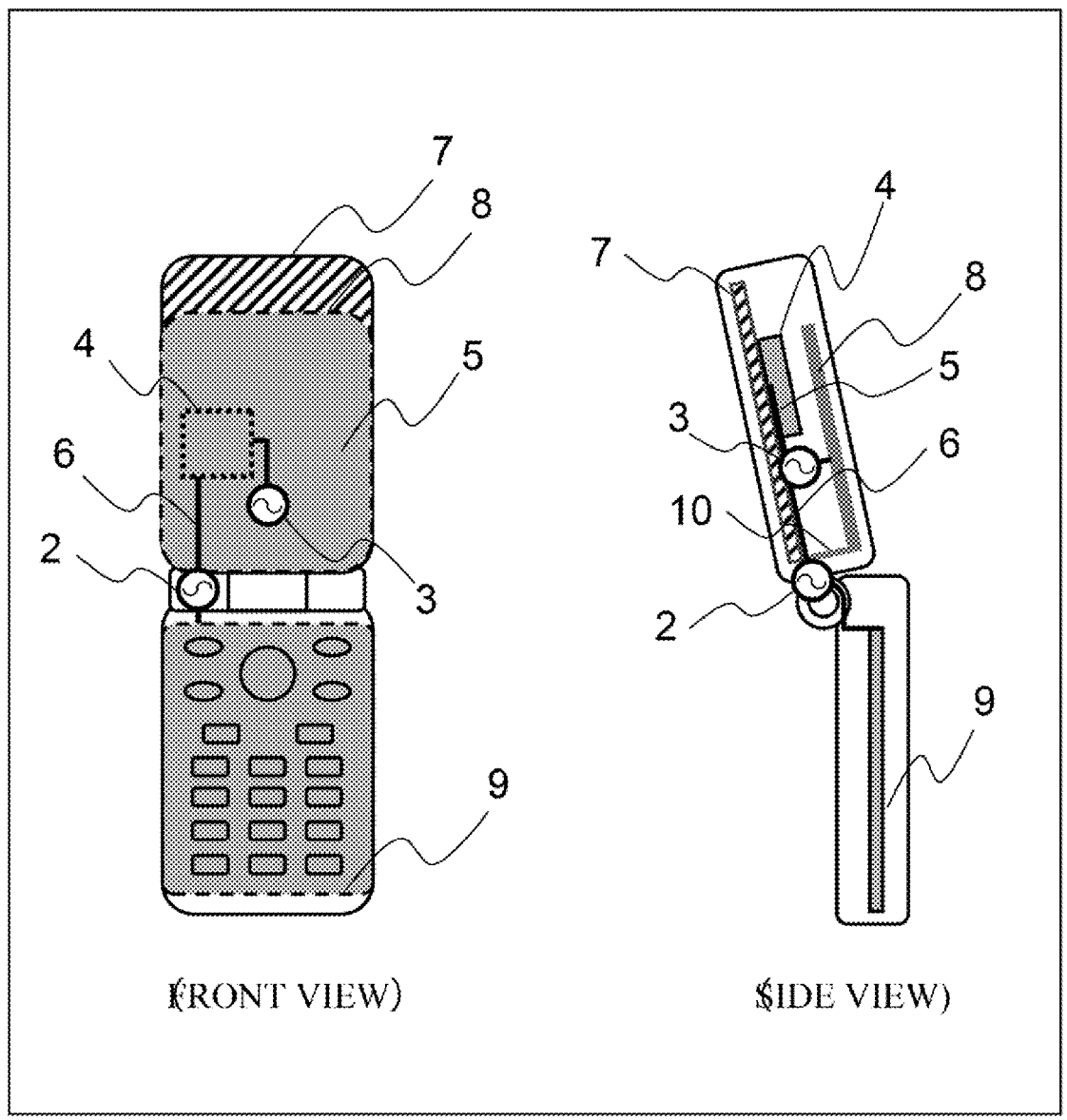
FIG. 17 is a diagram illustrating an internal structure of another mobile wireless communication apparatus according to the first embodiment of the present invention.

It is noted that in the first embodiment described above, an example where the wireless communication circuit 4 is mounted on the ground conductor section 9 is described. However, as shown in FIG. 17, the wireless communication circuit 4 may be mounted on the first conductor section 7. Using such a structure provides an effect that the second power feeding line 5 wired to the second power supply section 3 can be shortened. Moreover, the first conductor section 7 becomes a ground shared by the first power supply section 2 and the second power supply section 3, thereby providing an advantage that stabilization of the ground and simplification of the structure can be realized.

In the first embodiment described above, the mobile wireless communication apparatus having a flip-type structure shown in FIG. 1 is described as one example. However, the antenna array structure of the present invention can be applied also to mobile wireless communication apparatuses having other various structures (straight type or slide type).

Moreover, if a part of a housing of a mobile wireless communication apparatus is formed by a conductive material, the part can also be used as the first conductor section 7.

(Second Embodiment)

Figure 18:
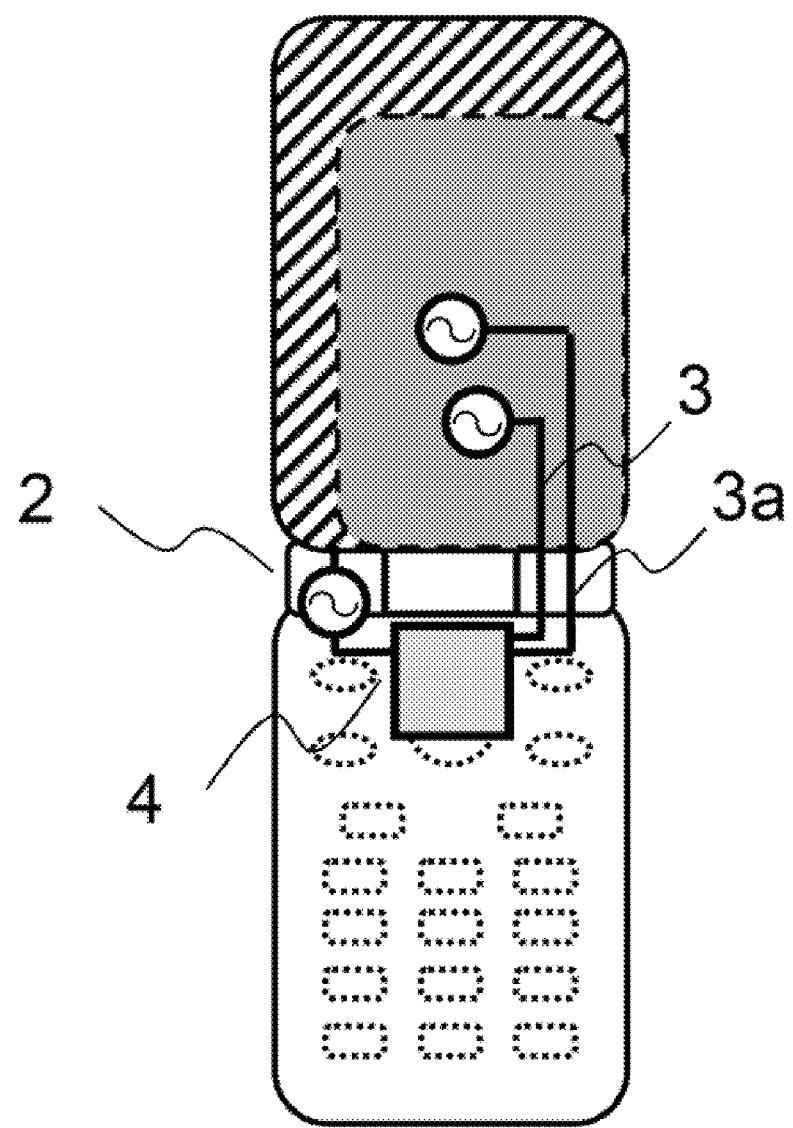
FIG. 18 is a diagram illustrating an internal structure of a mobile wireless communication apparatus according to a second embodiment of the present invention.

FIG. 18 is a front view transparently showing an internal structure of a mobile wireless communication apparatus according to a second embodiment of the present invention. The mobile wireless communication apparatus according to the second embodiment has a structure in which a second power supply section 3a is additionally provided in the mobile wireless communication apparatus according to the first embodiment described above.

The second power supply section 3 is a power supply section for obtaining a resonance in the long-side direction of the ¼ wavelength one-end-short-circuited patch antenna 30. On the other hand, the second power supply section 3a is a power supply section for obtaining a resonance in the short-side direction of the ¼ wavelength one-end-short-circuited patch antenna 30. In this example, a low frequency (first frequency) is obtained by the second power supply section 3, and a high frequency (second frequency) is obtained by the second power supply section 3a. Moreover, in the structure in the second embodiment, since the two resonance directions are perpendicular to each other, an effect that the two resonances are hardly affected by each other is also obtained.

Figure 19:
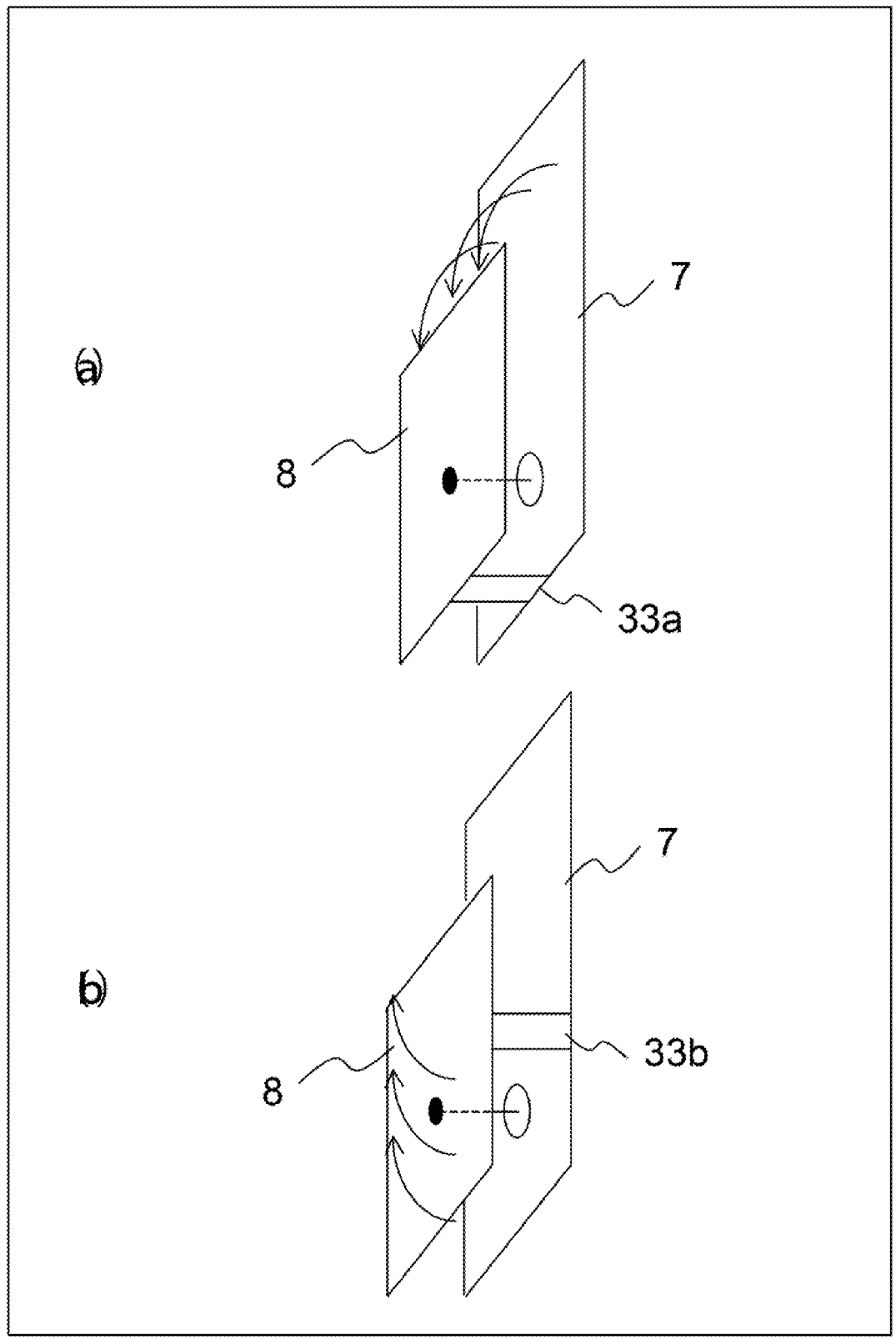
FIG. 19 is a diagram illustrating a structure of the ¼ wavelength one-end-short-circuited patch antenna 30 shown in FIG. 18.

Next, a structure of the ¼ wavelength one-end-short-circuited patch antenna 30 for realizing the mobile wireless communication apparatus according to the second embodiment will be described with reference to FIG. 19.

As short-circuit conductor sections for the ¼ wavelength one-end-short-circuited patch antenna 30 of the second embodiment, a short-circuit conductor section 33a for the first frequency and a short-circuit conductor section 33b for the second frequency are provided. In a case where a resonance is caused at the first frequency, the short-circuit conductor section 33a is short-circuited, and the short-circuit conductor section 33b is open-circuited. On the other hand, in a case where a resonance is caused at the second frequency, the short-circuit conductor section 33a is open-circuited, and the short-circuit conductor section 33b is short-circuited. Thus, it becomes possible to realize two resonances perpendicular to each other.

Figure 20:
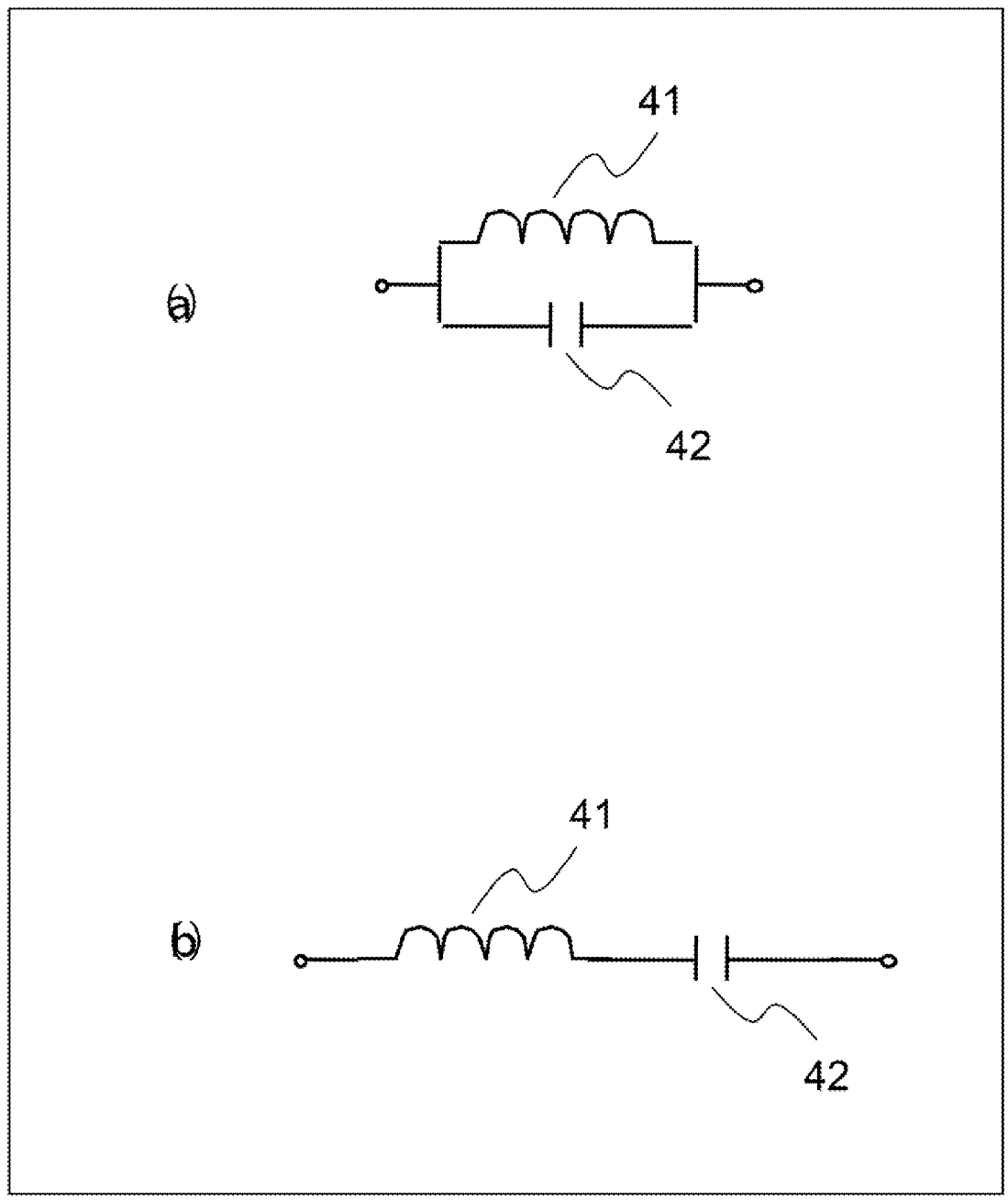
FIG. 20 is a diagram illustrating a specific example of a circuit for realizing short-circuit conductor sections 33a and 33b.
Figure 21:
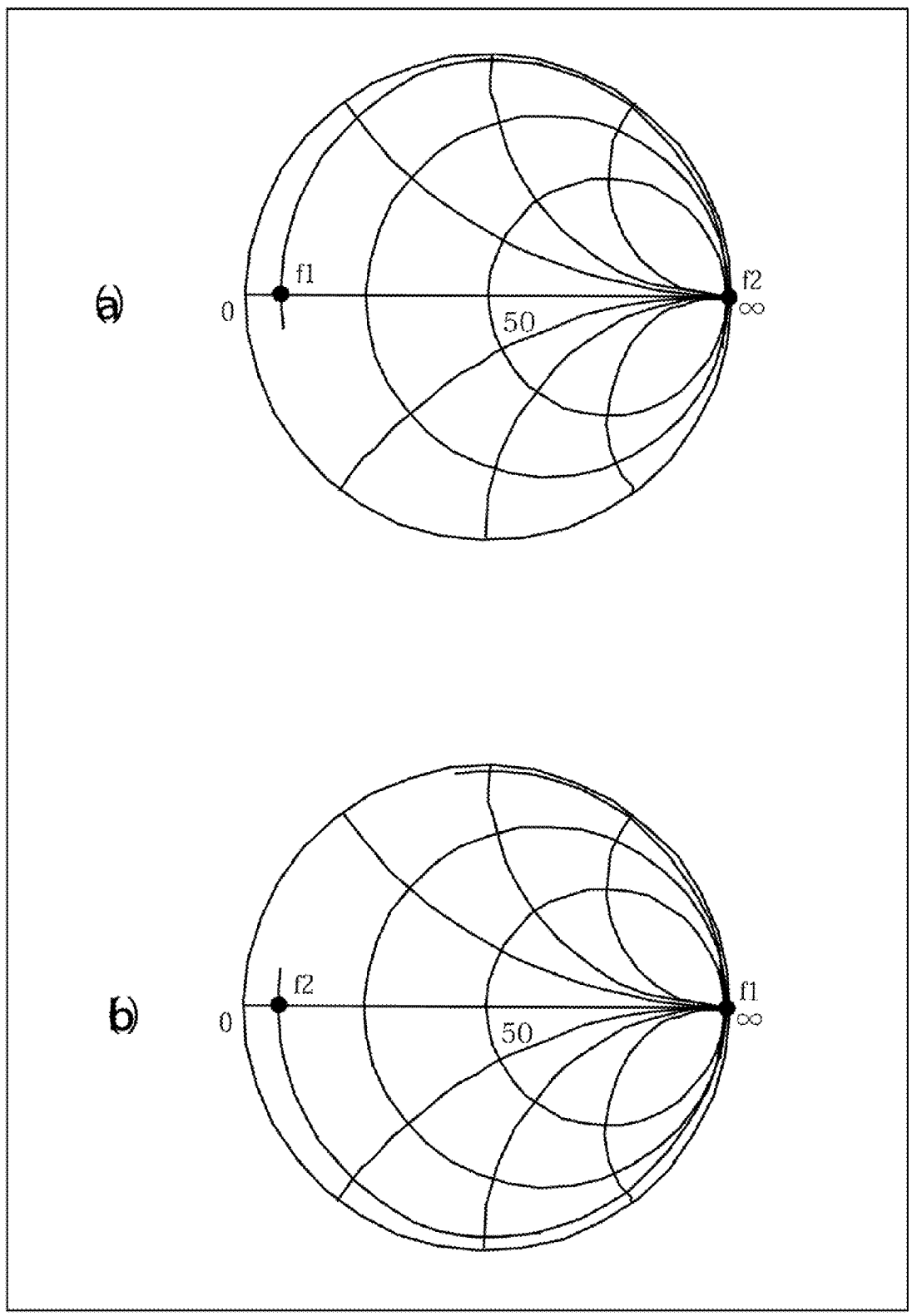
FIG. 21 is a Smith chart of the circuit shown in FIG. 20.

FIG. 20 shows a specific example of a circuit for realizing the short-circuit conductor sections 33a and 33b. (a) of FIG. 20 shows a parallel resonance circuit including an inductor 41 and a capacitor 42, and the impedance reaches infinite value at a resonance frequency and the circuit is open-circuited. A Smith chart for this state is as shown in (a) of FIG. 21. The circuit of this example is designed so as to obtain a resonance at the second frequency f2. In this case, at the first frequency f1, the circuit has low impedance and becomes short-circuited. On the other hand, as shown in (b) of FIG. 21, if an inductance value of the inductor 41 and a capacitance value of the capacitor 42 are set so as to obtain a resonance at the first frequency f1, the circuit becomes open-circuited at the first frequency f1, and at the second frequency f2 which is higher than the first frequency f1, the circuit has low impedance and becomes short-circuited.

(b) of FIG. 20 shows a series resonance circuit including the inductor 41 and the capacitor 42, and the impedance reaches 0 at a resonance frequency and the circuit is short-circuited. A Smith chart for this state is as shown in (a) FIG. 21. The circuit of this example is designed so as to obtain a resonance at the first frequency f1. In this case, at the second frequency f2, the circuit has high impedance and becomes almost open-circuited. On the other hand, as shown in (b) FIG. 21, if values of the inductor 41 and the capacitor 42 are set so as to obtain a resonance at the second frequency f2, the circuit becomes short-circuited at the second frequency f2, and at the first frequency f1 which is lower than the second frequency f2, the circuit has high impedance and becomes almost open-circuited.

Figure 22:
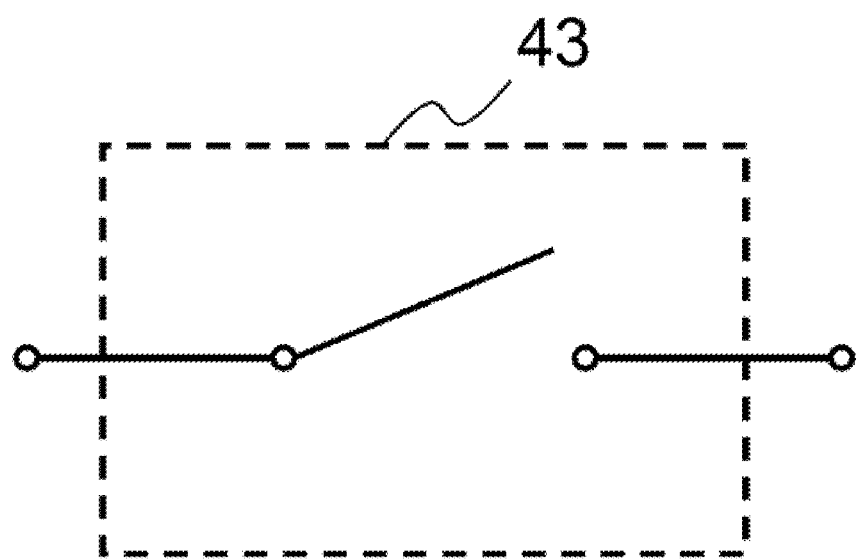
FIG. 22 is a diagram illustrating another specific example of a circuit for realizing the short-circuit conductor sections 33a and 33b.

Alternatively, a switch 43 shown in FIG. 22 may be used for the short-circuit conductor sections 33a and 33b. In this case, when operation is performed at the first frequency, the switch 43 of the short-circuit conductor section 33a is caused to be closed and the switch 43 of the short-circuit conductor section 33b is caused to be open-circuited. On the other hand, when operation is performed at the second frequency, the switch 43 of the short-circuit conductor section 33b is caused to be closed and the switch 43 of the short-circuit conductor section 33a is caused to be open-circuited.

As described above, in the mobile wireless communication apparatus according to the second embodiment of the present invention, a circuit in which the impedance changes depending on a frequency is used for the short-circuit conductor sections 33a and 33b, thereby enabling operation in which resonances occur at two frequencies, respectively, in one device.

(Third Embodiment)

Figure 23:
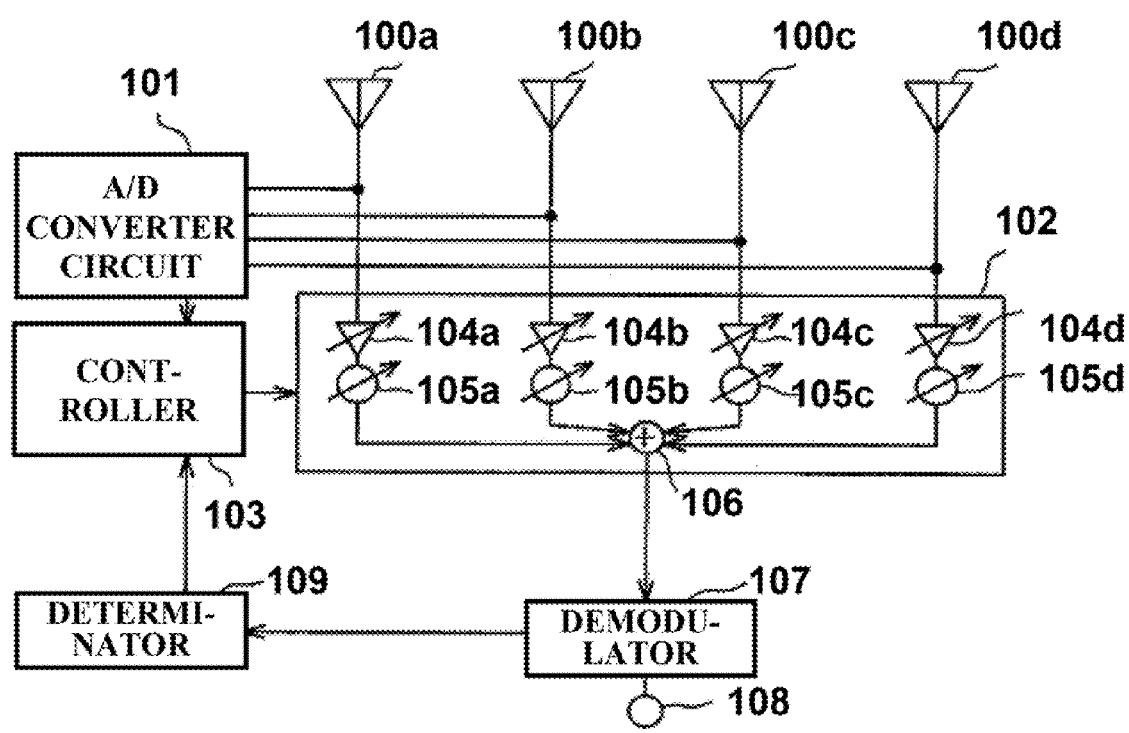
FIG. 23 is a diagram illustrating a configuration of an adaptive antenna device according to a third embodiment of the present invention.

FIG. 23 is a diagram illustrating a configuration of an adaptive antenna device according to a third embodiment of the present invention. In FIG. 23, the adaptive antenna device according to the third embodiment includes four antenna elements 100a to 100d, an analog/digital conversion circuit (A/D conversion circuit) 101, an adaptive control circuit 102, a controller 103, a determiner 109, and a demodulator 107. The housing antenna 20 and the ¼ wavelength one-end-short-circuited patch antenna 30 which are described in the above first embodiment are used for any two of the four antenna elements 100a to 100d.

In FIG. 23, a wireless signal received by each of the antenna elements 100a to 100d is inputted to each of the A/D conversion circuit 101 and the adaptive control circuit 102. The A/D conversion circuit 101 includes A/D converters corresponding to the antenna elements 100a to 100d, respectively. The A/D conversion circuit 101 converts, to digital signals, the wireless signals which are analog and received at the antenna elements 100a to 100d, and then outputs the digital signals to the controller 103.

The adaptive control circuit 102 includes four variable amplifiers 104a to 104d, four variable phase shifters 105a to 105d, and a signal combining device 106. An amplitude amount obtained by the variable amplifiers 104a to 104d and a phase shift amount of the variable phase shifters 105a to 105d are controlled by the controller 103. The wireless signal received by the antenna element 100a is outputted via the variable amplifier 104a and the variable phase shifter 105a, the wireless signal received by the antenna element 100b is outputted via the variable amplifier 104b and the variable phase shifter 105b, the wireless signal received by the antenna element 100c is outputted via the variable amplifier 104c and the variable phase shifter 105c, and the wireless signal received by the antenna element 100d is outputted via the variable amplifier 104d and the variable phase shifter 105d, all to the signal combining device 106. The signal combining device 106 combines (sums) the four inputted wireless signals and outputs a resultant signal to the demodulator 107.

The demodulator 107 demodulates the wireless signal which is obtained through the combining and then is inputted from the signal combining device 106, into a baseband signal which is a demodulated signal, by using a predetermined digital demodulation method, and then outputs the baseband signal to an output terminal 108 and the determiner 109. The determiner 109 determines an error rate based on a reference pattern, of the inputted baseband signal, which is obtained within a predetermined reference pattern period, and outputs the error rate to the controller 103. The controller 103 controls the adaptive control circuit 102 so as to receive and demodulate a wireless signal having an optimum signal integrity by using an adaptive control method described in detail below.

It is noted that in FIG. 23, a fundamental configuration for processing the wireless signal, such as a high-frequency filter, a high-frequency amplifier, a high-frequency circuit, an intermediate frequency circuit, a signal processing circuit, and the like is not shown. That is, in the adaptive control circuit 102, the processing may be performed at a carrier wave frequency, or may be performed at an intermediate frequency. In addition, in the adaptive control circuit 102, the order in which the variable amplifiers 104a to 104d and the variable phase shifters 105a to 105d are arranged may be reversed.

The adaptive control method performed by the adaptive antenna device will be described below.

In the adaptive control method, the adaptive antenna device maximizes a radiation pattern of the antennas in a direction from which a desired wireless wave comes (that is, substantially points a main beam included in the radiation pattern of the antenna toward the direction of the desired wave), and points a NULL included in the radiation pattern toward a direction of an interference wave that can cause jamming (that is, substantially points a NULL included in the radiation pattern of the antennas toward the direction of the interference wave), thereby realizing stable wireless communication. Normally, the adaptive antenna device performs a control so as to obtain a maximum desired signal power and a minimum interference signal power by causing the wireless signals (or intermediate frequency signals obtained by converting a frequency of the wireless signals) received by the antenna elements 100a to 100d to have different amplitudes and different phases from each other.

In general, in the antenna elements 100a to 100d, not only the desired wave but also a thermal noise component is received. Moreover, it can occur that the antenna elements 100a to 100d receive a co-channel interference wave, having the same frequency, emitted from a nearby base station, and a delayed wave which is a desired wave that arrives with a delay due to taking a long route. A delayed wave deteriorates a quality of a screen display, that is, for example, generates a ghost displayed by a television receiver, in an analog wireless communication system which performs, for example, a television broadcast or a wireless broadcast. On the other hand, in a digital wireless communication system, a thermal noise component, a co-channel interference wave, and a delayed wave cause a bit error, thereby directly deteriorating a signal integrity. When C represents a desired wave power, N represents a thermal noise power, and I represents power of an interference wave including a co-channel interference wave and a delayed wave, it is preferable that the adaptive antenna device performs adaptive control so as to maximize C/(N+I) in order to improve a signal integrity.

Next, adaptive control operation of the adaptive antenna device will be described specifically.

The wireless signals received by the antenna elements 100a to 100d are converted to a digital signal x(t) (in the present embodiment, a signal vector having four elements) by the A/D conversion circuit 101, and the digital signal x(t) is inputted to the controller 103. The controller 103 determines an amplitude amount which is to be obtained by the variable amplifiers 104a to 104d in the adaptive control circuit 102, and a phase shift amount which is to be obtained by the variable phase shifters 105a to 105d in the adaptive control circuit 102, so as to maximize an integrity of a wireless signal y(t) outputted from the adaptive control circuit 102.

A method for calculating a weighting coefficient including the amplitude amount and the phase shift amount is shown as follows. It is noted that the weighting coefficient Wi is defined by the following equation (1) with use of the amplitude amount Ai and the phase shift amount ϕi.

$$Wi = Ai \times \exp(j \times \phi i) \tag{1}$$

Wherein j represents an imaginary unit. In addition, i can be 1, 2, 3, or 4, and corresponds to the processings of the wireless signals received by the antenna elements 100a to 100d, respectively. While a weighting coefficient vector W is defined as having the weighting coefficients Wi as components thereof, a method for obtaining the weighting coefficient Wi will be described below.

There are several methods for obtaining the weighting coefficients Wi. In the present embodiment, an example where a steepest descent method (LMS: Least Means Squares) is used will be described. In this method, the adaptive antenna device previously stores a reference signal r(t) which is a signal sequence included in a known desired wave, and performs a control such that a signal sequence included in the received wireless signals is near to the reference signal r(t). In the present embodiment, a case where the reference signal r(t) is previously stored in the controller 103 is described as an example. Specifically, the controller 103 controls the adaptive control circuit 102 so as to multiply the wireless digital signal x(t) by the weighting coefficient w(t) which includes the amplitude and the phase shift amount as the components thereof. A residual e(t) between the reference signal r(t) and the multiplication result obtained by multiplying the wireless digital signal x(t) by the weighting coefficient w(t), is obtained by using the following equation (2).

$$e(t) = r(t) - W(t) \times x(t) \tag{2}$$

Wherein the residual e(t) can be positive or negative. Therefore, a minimum square value of a square of the residual e(t) that is obtained by using the above equation (2) is obtained by recursively repeating a calculation. That is, the weighting coefficient w(t, m+1) which is obtained by repeating a calculation multiple times (m+1 times) is obtained in accordance with the following equation (3) with use of the m-th weighting coefficient w(t, m).

$$W(t, m+1) = W(t, m) + u \times x(t) \times e(t, m) \tag{3}$$

Wherein u represents a step size. If the step size u is large, there is an advantage that the required number of times a calculation is repeated until the weighting coefficient w converges to the minimum value is reduced. However, if the step size u is too large, there is a disadvantage that the weighting coefficient w oscillates around the minimum value. Therefore, in the system, the step size u needs to be determined with a sufficient consideration. On the other hand, by decreasing the step size u, the weighting coefficient w stably converges to the minimum value. However, the number of times a calculation is repeated increases. If the number of times a calculation is repeated increases, a time period during which the weighting coefficient is obtained increases. If the time period for calculating the weighting coefficient w is longer than time (e.g., several milliseconds) in which the ambient environment varies, it is impossible to improve the signal integrity by using the weighting coefficient w. Accordingly, it is necessary to adopt a condition in which the convergence is as fast and stable as possible in order to determine the step size u. In addition, the residual e(t, m) is defined by using the following equation (4).

$$e(t, m) = r(t) - W(t, m) \times x(t) \tag{4}$$

The equation (3) is recursively updated by using a value obtained from the equation (4). The maximum number of times a calculation is repeated for obtaining the weighting coefficient w is set such that the time period for calculating the weighting coefficient is not longer than time for switching the wireless system.

In the above description, a determination method, based on the steepest descent method, used in the adaptive control of the wireless communication system is described as an example. However, the present invention is not limited thereto. For example, an RLS (Recursive Least-Squares) method or an SMI (Sample Matrix inversion) method, which enables a determination period to be reduced, can also be used. Although these methods make the determination fast, a calculation at the determiner 109 becomes complicated. Moreover, if a modulation method of a signal sequence is constant envelope modulation, such as digital phase modulation, which uses a constant envelope, a CMA (Constant Modulus Algorithm) can also be used.

Figure 24:
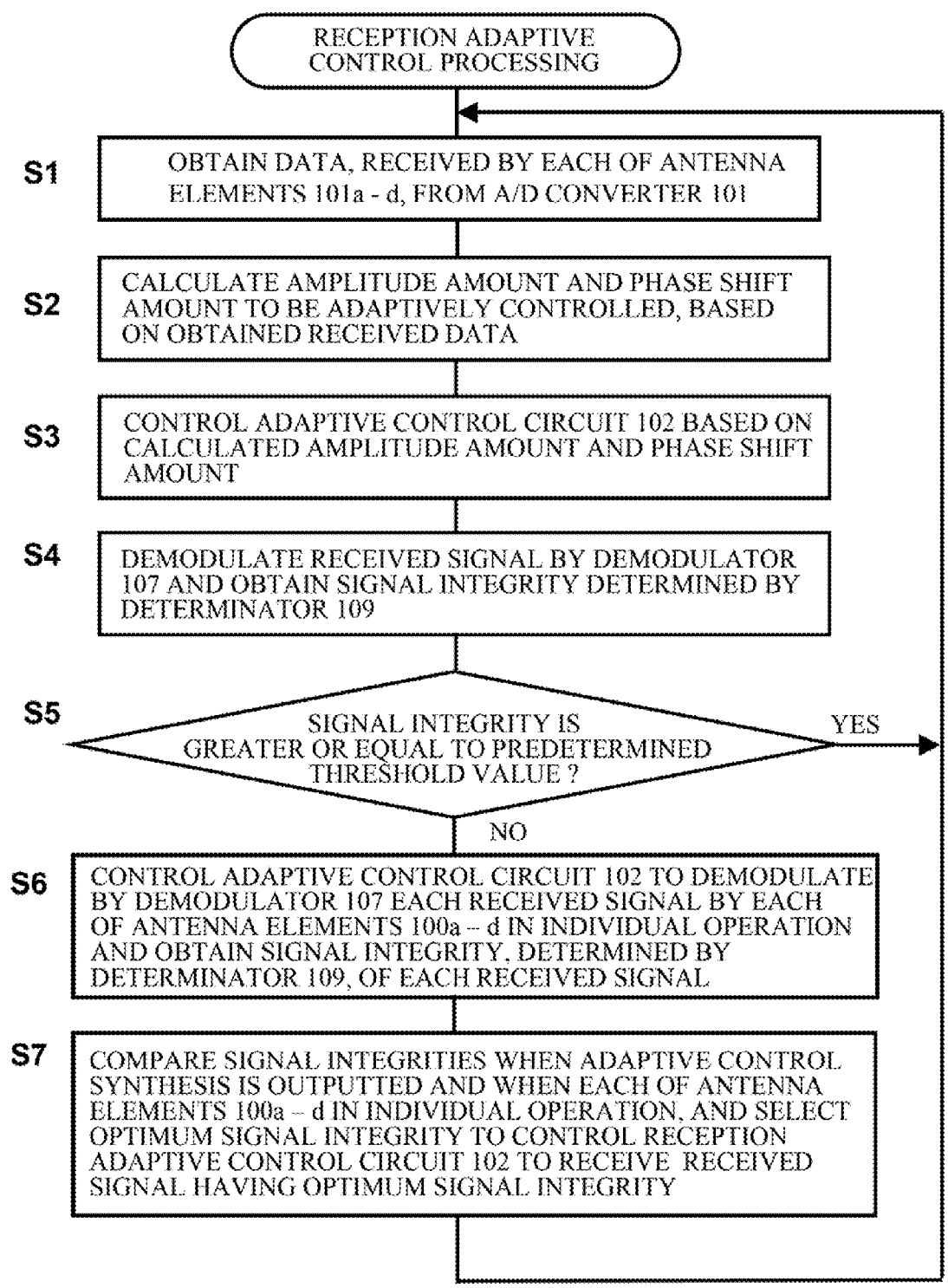
FIG. 24 is a flow chart showing adaptive control processing performed by a controller 103 shown in FIG. 23.

FIG. 24 is a flow chart showing the adaptive control processing performed by the controller 103 shown in FIG. 23.

In FIG. 24, firstly, the controller 103 obtains received data of the antenna elements 100a to 100d, from the A/D conversion circuit 101 (step S1). Next, the controller 103 calculates an amplitude amount and a phase shift amount required for the adaptive control based on the obtained received data (step S2), and controls the adaptive control circuit 102 based on the calculated amplitude amount and phase shift amount (step S3). The determiner 109 demodulates the reception signal outputted from the demodulator 107. The controller 103 obtains a signal integrity, i.e., an error rate, determined by the determiner 109 (step S4). Thereafter, the controller 103 determines whether or not the obtained error rate is equal to or larger than a predetermined threshold value (step S5).

If it is determined at step S5 that the error rate is equal to or larger than $10^{-5}$, the controller 103 again obtains received data of the antenna elements 100a to 100d from the A/D conversion circuit 101 (step S1). On the other hand, if it is determined at step S5 that the error rate is smaller than $10^{-5}$, the controller 103 controls the adaptive control circuit 102 to obtain, from the determiner 109, error rates of the signals received by the antenna elements 100a to 100d in a state where one of the antenna elements 100a to 100d is used (step S6).

It is noted that the state where one of the antenna elements 100a to 100d is used corresponds to a state where only one of the antenna elements 100a to 100d is operated. For example, in a state where the antenna element 100a is used, the antenna element 100a is operated and the antenna elements 100b to 100d are not operated. In this case, specifically, an amplification factor of the variable amplifier 104a is set to "1" and the phase shift amount of the variable phase shifter 105a is set to "0", and on the other hand, an amplification factor of each of the variable amplifiers 104b to 104d is set to "0".

Finally, the controller 103 controls the adaptive control circuit 102 to compare the error rate obtained when combining and outputting are performed in the adaptive control, with the error rates of the signals received by the antenna elements 100a to 100d in a state where one of the antenna elements 100a to 100d is used, so as to select an optimum error rate and receive a reception signal having the selected optimum error rate (step S7).

It is noted that in FIG. 24, it is preferable that processing waits for a predetermined time period before returning to step S1 from step S5 or returning to step S1 from step S7.

As described above, in the adaptive antenna device according to the third embodiment of the present invention, the adaptive control circuit 102 is controlled such that, by using the four antenna elements 100a to 100d, adaptive control and determination of an error rate are performed, and when the error rate is smaller than a predetermined threshold value, determination of error rates of signals received by the antenna elements 100a to 100d in a state where one of the antenna elements 100a to 100d is used is performed so as to receive a reception signal having an optimum error rate. Thus, adaptive control and switching control that performs switching into a state where one of the antenna elements is used, are performed, thereby enabling a reception signal having an optimum signal integrity to be always selected.

(Fourth Embodiment)

Figure 25:
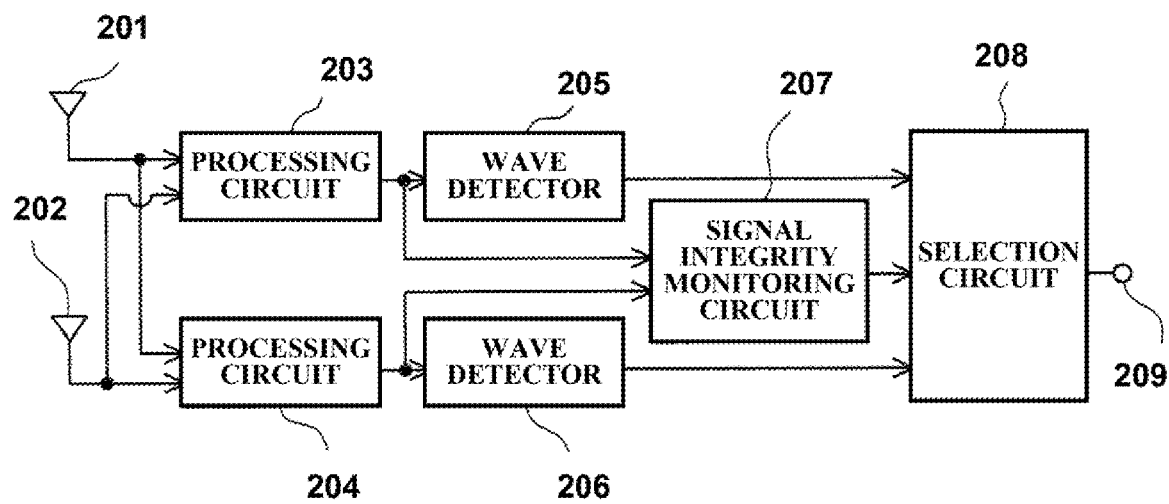
FIG. 25 is a diagram illustrating a configuration of a selective diversity antenna device according to a fourth embodiment of the present invention.

FIG. 25 is a diagram illustrating a configuration of a selective diversity antenna device according to a fourth embodiment of the present invention. In FIG. 25, the selective diversity antenna device according to the fourth embodiment includes two antenna elements 201 and 202, two processing circuits 203 and 204, a signal integrity monitor circuit 207, and a selection circuit 208. The housing antenna 20 and the ¼ wavelength one-end-short-circuited patch antenna 30 described in the above first embodiment are used for the two antenna elements 201 and 202.

First, wireless signals received by the antenna elements 201 and 202 are inputted to both of the processing circuits 203 and 204. The processing circuit 203 performs adaptive control processing to the inputted wireless signals, and then outputs the resultant signal to a detector 205 and the signal integrity monitor circuit 207. It is noted that the processing circuit 203 suppresses an interference wave included in the received wireless signals to keep the signal integrity excellent. That is, a significant effect is obtained in a case where a delay wave, or a co-channel interference wave from a nearby base station, comes. On the other hand, the processing circuit 204 performs selective diversity processing to the inputted wireless signals, and then outputs the resultant signal to a detector 206 and the signal integrity monitor circuit 207. It is noted that the processing circuit 204 selects a wireless signal having largest received power of the wireless signals received by the antenna elements 201 and 202 to keep the signal integrity excellent. That is, a significant effect is obtained in a case where received power fluctuates largely due to fading and the like.

The signal integrity monitor circuit 207 determines the signal integrity of a baseband signal obtained by demodulating the wireless signal to which adaptive control processing has been performed by the processing circuit 203, and the signal integrity of the wireless signal to which selective diversity processing has been performed by the processing circuit 204. Based on a result of the determination by the signal integrity monitor circuit 207, the selection circuit 208 selects a baseband signal outputted from one, of the detectors 205 and 206, corresponding to a signal having a preferable signal integrity, and then outputs the selected baseband signal to the output terminal 209.

As described above, the selective diversity antenna device according to the fourth embodiment of the present invention can solve both an interference wave and fading which are two main causes of deteriorating the signal integrity of the reception signal in a mobile communication system.

(Fifth Embodiment)

Figure 26:
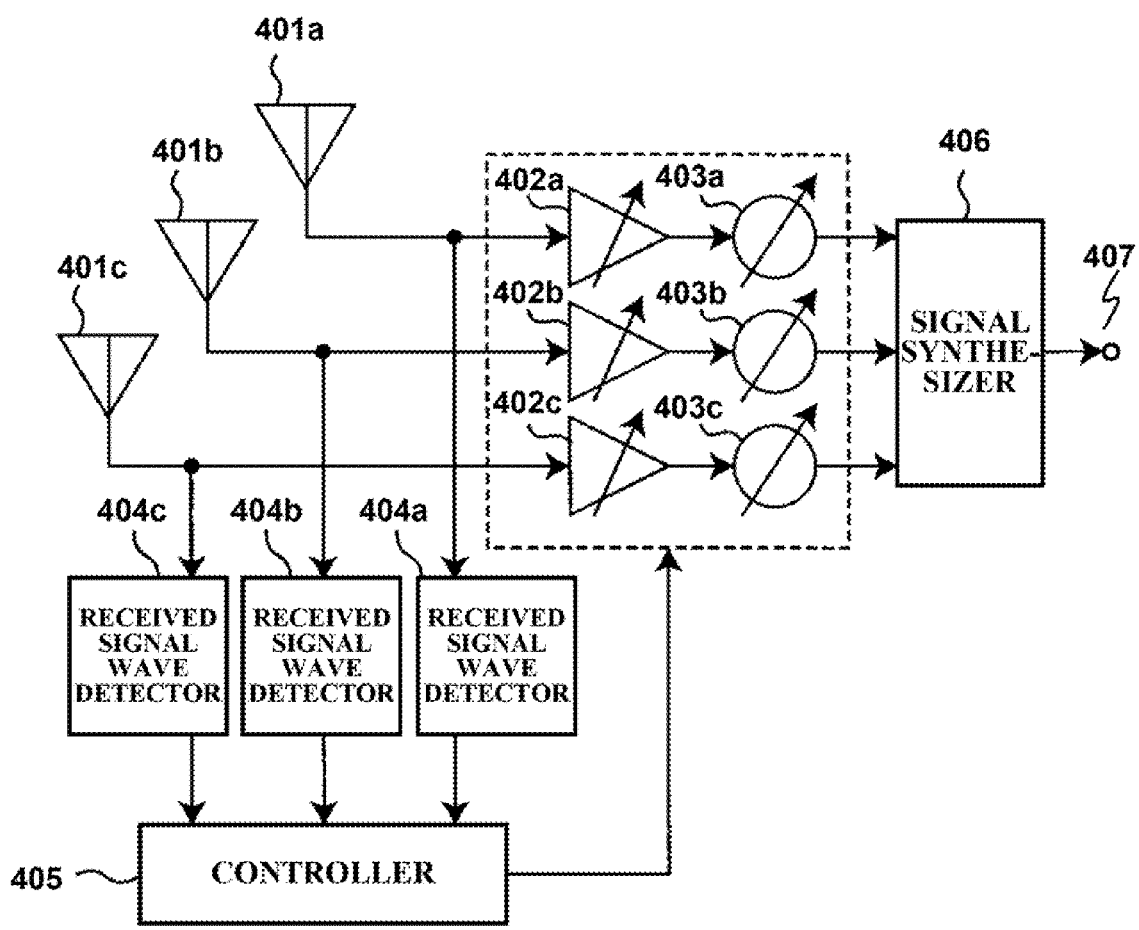
FIG. 26 is a diagram illustrating a configuration of a combining diversity antenna device according to a fifth embodiment of the present invention.

FIG. 26 is a diagram illustrating a configuration of a combining diversity antenna device according to a fifth embodiment of the present invention. In FIG. 26, the combining diversity antenna device according to the fifth embodiment includes three antenna elements 401a to 401c, variable amplifiers 402a to 402c, variable phase shifters 403a to 403c, a signal combining device 406, reception signal detectors 404a to 404c, and a controller 405. The variable amplifiers 402a to 402c are amplifiers in which the amplification factor can be positive or negative, that is, each of the variable amplifiers 402a to 402c can also act as an attenuator. The housing antenna 20 and the ¼ wavelength one-end-short-circuited patch antenna 30 described in the above first embodiment are used for any two of the three antenna elements 401a to 401c.

In FIG. 26, wireless signals received by the antenna elements 401a to 401c are inputted to the variable amplifiers 402a to 402c, respectively, and also to the reception signal detectors 404a to 404c, respectively. The reception signal detectors 404a to 404c detect the phases and the amplitudes of the wireless signals, respectively, and output data obtained by the detection to the controller 405. By using a known adaptive control method, the controller 405 controls the amplification factors of the variable amplifiers 402a to 402c and the phase shift amounts of the variable phase shifters 403a to 403c so as to perform maximum ratio combining to the three wireless signals received by the antenna elements 401a to 401c. That is, the variable amplifiers 402a to 402c amplify or attenuate the wireless signals in accordance with the ratio of the amplitudes of the wireless signals, and then the variable phase shifters 403a to 403c bring the phases of the wireless signals in-phase and output the resultant wireless signals to the signal combining device 406. The signal combining device 406 in-phase-combines the inputted three wireless signals through maximum ratio combining, and then outputs the resultant signals to the output terminal 407.

As described above, the combining diversity antenna device according to the fifth embodiment of the present invention enables constant received power to be obtained.

(Sixth Embodiment)

Figure 27:
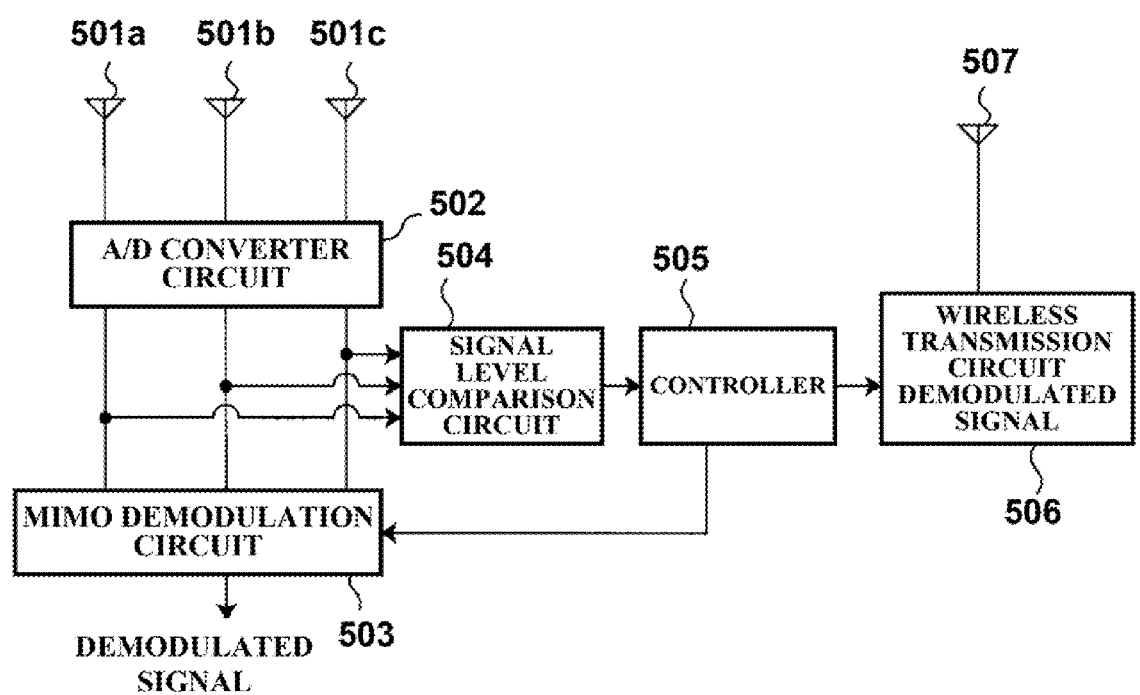
FIG. 27 is a diagram illustrating a configuration of a MIMO antenna device according to a sixth embodiment of the present invention.

FIG. 27 is a diagram illustrating a configuration of a MIMO antenna device according to a sixth embodiment of the present invention. In FIG. 27, the MIMO antenna device according to the sixth embodiment includes three power feeding antenna elements 501a to 501c, an analog/digital conversion circuit (A/D conversion circuit) 502, and a MIMO demodulation circuit 503, a signal level comparison circuit 504, a controller 505, a wireless transmission circuit 506, and a transmitting antenna element 507. The housing antenna 20 and the ¼ wavelength one-end-short-circuited patch antenna 30 described in the first embodiment are used for any two of the three power feeding antenna elements 501a to 501c.

The three power feeding antenna elements 501a to 501c are provided for receiving three different wireless signals, respectively, which are transmitted from the base station equipment on the MIMO transmission side (not shown) by using a predetermined MIMO modulation method. The power feeding antenna elements 501a to 501c input the received wireless signals to the A/D conversion circuit 502. The A/D conversion circuit 502 includes three A/D converters corresponding to the inputted wireless signals, respectively. The A/D converters perform A/D conversion processing to the wireless signals, respectively, and then output the processed signals (hereinafter, referred to as reception signals) to both the MIMO demodulation circuit 503 and the signal level comparison circuit 504.

The MIMO demodulation circuit 503 performs MIMO demodulation processing to the three reception signals and then outputs one demodulated signal. The signal level comparison circuit 504 performs comparison among signal levels of the three reception signals, and outputs information of a result of the comparison to the controller 505. Depending on the results of the MIMO adaptive control processing, the controller 505 may change the type of MIMO communication used in the base station equipment on the MIMO transmission side and the MIMO demodulation circuit 503. That is, the controller 505 transmits, by using the wireless transmission circuit 506 and the transmitting antenna element 507, a control signal which requires the MIMO device of the transmission base station to change the type of MIMO modulation used in the MIMO device of the transmission base station, while the controller 505 changes the type of MIMO demodulation used in the MIMO demodulation circuit 503 accordingly.

In the MIMO antenna device according to the sixth embodiment, it is preferable that a high-frequency filter for separating a signal of a predetermined frequency from the wireless signals received by the power feeding antenna elements 501a to 501c, and a high-frequency amplifier for amplifying the signals are provided preceding the A/D conversion circuit 502, as needed. Moreover, in the MIMO antenna device according to the sixth embodiment, it is preferable that a high-frequency circuit, such as a mixer, for converting frequencies of the reception signals outputted from the A/D conversion circuit 502, an intermediate frequency circuit, a signal processing circuit, and the like are provided preceding the MIMO demodulation circuit 503, as needed. It is noted that the above components are not described and not shown in the specification and the drawings of the present invention for the purpose of simplifying the description.

INDUSTRIAL APPLICABILITY

The present invention is applicable to a wireless communication apparatus and the like having a MIMO antenna and/or an adaptive array antenna, and in particular, is suitable for performing control so as to realize high-speed communication by increasing communication capacity and to keep communication quality excellent in mobile communication using a mobile telephone and the like.

The invention claimed is:

1. A mobile wireless communication apparatus comprising:
   a first conductor section;
   a second conductor section arranged in parallel with and spaced from the first conductor section so as to have a predetermined distance there between, the second conductor section having a different size from that of the first conductor section;
   a short-circuit conductor section electrically connecting one edge of the first conductor section to one edge of the second conductor section that is facing the one edge of the first conductor section;
   a ground conductor section spaced by a predetermined distance from the first conductor section; and
   a wireless communication circuit, wherein
   a first feeding point on the first conductor section is connected to the wireless communication circuit via a first power supply section provided between the first conductor section and the ground conductor section, so that the first conductor section and the ground conductor section operate as a first antenna element,
   a second feeding point on the second conductor section is connected to the wireless communication circuit via a second power supply section provided between the first conductor section and the second conductor section, so that the first conductor section, the second conductor section, and the short-circuit conductor section operate as a second antenna element, and
   a sum of: a length of a path passing from the one edge of the second conductor section which is connected to the short-circuit conductor section, through the second feeding point, to an open edge of the second conductor section which is opposed to the one edge of the second conductor section; and a length of the short-circuit conductor section, between the first conductor section and the second conductor section, is a ¼ length of a wavelength of a communication signal so that the second antenna element operates as a ¼ wavelength one-end-short-circuited patch antenna.

2. The mobile wireless communication apparatus according to claim 1, wherein the first conductor section is a part of a housing of the mobile wireless communication apparatus, the housing being formed of a conductive material.

3. The mobile wireless communication apparatus according to claim 1, wherein the wireless communication circuit is mounted on the first conductor section.

4. The mobile wireless communication apparatus according to claim 1, further comprising:
   an adaptive control circuit for performing adaptive control processing to wireless signals received by the first and the second antenna elements and to combine the wireless signals to which the adaptive control processing has been performed;
   a demodulation circuit for demodulating, while demodulating the combined wireless signal from the adaptive control circuit, a wireless signal received by the first antenna element alone and a wireless signal received by the second antenna element alone; and
   an apparatus control circuit for controlling the adaptive control circuit to compare a signal integrity of a signal obtained by demodulating the combined wireless signal, with respective signal integrities of signals obtained by demodulating the wireless signal which has been received by the first antenna element alone and the wireless signal which has been received by the second antenna element alone, so as to receive a wireless signal having a signal integrity which has been determined to be optimum through the comparison.

5. The mobile wireless communication apparatus according to claim 1, further comprising:
   a first processing circuit for performing adaptive control processing to wireless signals received by the first and the second antenna elements;

a second processing circuit for performing selective diversity processing to the wireless signals received by the first and the second antenna elements; and a selection circuit for comparing a signal integrity of a wireless signal outputted from the first processing, circuit with a signal integrity of a wireless signal outputted from the second processing circuit, so as to select, from the outputted wireless signals, a signal having a preferable signal integrity and output the selected signal.

6. The mobile wireless communication apparatus according to claim 1, further comprising:

an adaptive control circuit for performing adaptive control processing to wireless signals received by the first and the second antenna elements and to combine the wireless signals to which the adaptive control processing has been performed; and an apparatus control circuit for detecting phases and amplitudes of the wireless signals received by the first and the second antenna elements, and to control the adaptive control circuit so as to perform maximum ratio combining to the wireless signals.

7. The mobile wireless communication apparatus according to claim 1, further comprising a multi-input multi-output (MIMO) demodulation circuit for performing MIMO demodulation processing to wireless signals received by the first and the second antenna elements so as to output one demodulated signal.

8. A mobile wireless communication apparatus comprising:

a first conductor section;

a second conductor section arranged in parallel with and spaced from the first conductor section so as to have a predetermined distance there between, the second conductor section having a different size from that of the first conductor section;

a first parallel resonance circuit provided between one edge of the first conductor section and one edge of the second conductor section that is facing the one edge of the first conductor section, the first parallel resonance circuit having an inductor and a capacitor connected in parallel with each other;

a second parallel resonance circuit provided between another edge of the first conductor section and another edge of the second conductor section that is facing the other edge of the first conductor section, the second parallel resonance circuit having an inductor and a capacitor connected in parallel with each other;

a ground conductor section spaced by a predetermined distance from the first conductor section; and a wireless communication circuit, wherein the first parallel resonance circuit causes the first conductor section and the second conductor section to be electrically connected to each other for a signal of a first frequency and to be electrically open-circuited there between for a signal of a second frequency, the second parallel resonance circuit causes the first conductor section and the second conductor section to be electrically open-circuited there between for the signal of the first frequency and to be electrically connected to each other for the signal of the second frequency, a first feeding point on the first conductor section is connected to the wireless communication circuit via a first power supply section provided between the first conductor section and the ground conductor section so that the first conductor section and the ground conductor section operate as a first antenna element, and a second feeding point on the second conductor section is connected to the wireless communication circuit via a second power supply section provided between the first conductor section and the second conductor section so that the first conductor section, the second conductor section, and the first and the second parallel resonance circuits operate as a second antenna element.

9. The mobile wireless communication apparatus according to claim 8, further comprising:

an adaptive control circuit for performing adaptive control processing to wireless signals received by the first and the second antenna elements and to combine the wireless signals to which the adaptive control processing has been performed;

a demodulation circuit for demodulating, while demodulating the combined wireless signal from the adaptive control circuit, a wireless signal received by the first antenna element alone and a wireless signal received by the second antenna element alone; and an apparatus control circuit for controlling the adaptive control circuit to compare a signal integrity of a signal obtained by demodulating the combined wireless signal, with respective signal integrities of signals obtained by demodulating the wireless signal which has been received by the first antenna element alone and the wireless signal which has been received by the second antenna element alone, so as to receive a wireless signal having a signal integrity which has been determined to be optimum through the comparison.

10. The mobile wireless communication apparatus according to claim 8, further comprising:

a first processing circuit for performing adaptive control processing to wireless signals received by the first and the second antenna elements;

a second processing circuit for performing selective diversity processing to the wireless signals received by the first and the second antenna elements; and a selection circuit for comparing a signal integrity of a wireless signal outputted from the first processing, circuit with a signal integrity of a wireless signal outputted from the second processing circuit, so as to select, from the outputted wireless signals, a signal having a preferable signal integrity and output the selected signal.

11. The mobile wireless communication apparatus according to claim 8, further comprising:

an adaptive control circuit for performing adaptive control processing to wireless signals received by the first and the second antenna elements and to combine the wireless signals to which the adaptive control processing has been performed; and an apparatus control circuit for detecting phases and amplitudes of the wireless signals received by the first and the second antenna elements, and to control the adaptive control circuit so as to perform maximum ratio combining to the wireless signals.

12. The mobile wireless communication apparatus according to claim 8, further comprising a multi-input multi-output (MIMO) demodulation circuit for performing MIMO demodulation processing to wireless signals received by the first and the second antenna elements so as to output one demodulated signal.

13. A mobile wireless communication apparatus comprising:

a first conductor section;

a second conductor section arranged in parallel with and spaced from the first conductor section so as to have a predetermined distance there between, the second conductor section having a different size from that of the first conductor section;

a first switching circuit provided between one edge of the first conductor section and one edge of the second conductor section that is facing the one edge of the first conductor section;

a second switching circuit provided between another edge of the first conductor section and another edge of the second conductor section that is facing the other edge of the first conductor section;

a ground conductor section spaced by a predetermined distance from the first conductor section;

a wireless communication circuit; and a control section for, when a signal of a first frequency is received, causing the first switching circuit to be short-circuited and causing the second switching circuit to be open-circuited, and for, when a signal of a second frequency is received, causing the first switching circuit to be open-circuited and causing the second switching circuit to be short-circuited, wherein a first feeding point on the first conductor section is connected to the wireless communication circuit via a first power supply section provided between the first conductor section and the ground conductor section so that the first conductor section and the ground conductor section operate as a first antenna element, and a second feeding point on the second conductor section is connected to the wireless communication circuit via a second power supply section provided between the first conductor section and the second conductor section so that the first conductor section, the second conductor section, and the first and the second switching circuits operate as a second antenna element.

14. The mobile wireless communication apparatus according to claim 13, further comprising:

an adaptive control circuit for performing adaptive control processing to wireless signals received by the first and the second antenna elements and to combine the wireless signals to which the adaptive control processing has been performed;

a demodulation circuit for demodulating, while demodulating the combined wireless signal from the adaptive control circuit, a wireless signal received by the first antenna element alone and a wireless signal received by the second antenna element alone; and an apparatus control circuit for controlling the adaptive control circuit to compare a signal integrity of a signal obtained by demodulating the combined wireless signal, with respective signal integrities of signals obtained by demodulating the wireless signal which has been received by the first antenna element alone and the wireless signal which has been received by the second antenna element alone, so as to receive a wireless signal having a signal integrity which has been determined to be optimum through the comparison.

15. The mobile wireless communication apparatus according to claim 13, further comprising:

a first processing circuit for performing adaptive control processing to wireless signals received by the first and the second antenna elements;

a second processing circuit for performing selective diversity processing to the wireless signals received by the first and the second antenna elements; and a selection circuit for comparing a signal integrity of a wireless signal outputted from the first processing, circuit with a signal integrity of a wireless signal outputted from the second processing circuit, so as to select, from the outputted wireless signals, a signal having a preferable signal integrity and output the selected signal.

16. The mobile wireless communication apparatus according to claim 13, further comprising:

an adaptive control circuit for performing adaptive control processing to wireless signals received by the first and the second antenna elements and to combine the wireless signals to which the adaptive control processing has been performed; and an apparatus control circuit for detecting phases and amplitudes of the wireless signals received by the first and the second antenna elements, and to control the adaptive control circuit so as to perform maximum ratio combining to the wireless signals.

17. The mobile wireless communication apparatus according to claim 13, further comprising a multi-input multi-output (MIMO) demodulation circuit for performing MIMO demodulation processing to wireless signals received by the first and the second antenna elements so as to output one demodulated signal.

* * * * *